July 5, 1938.  H. E. KLEINSCHMIDT  2,122,945
METHOD OF AND MACHINE FOR MARKING LEATHER OR THE LIKE
Filed Jan. 24, 1936  13 Sheets-Sheet 1
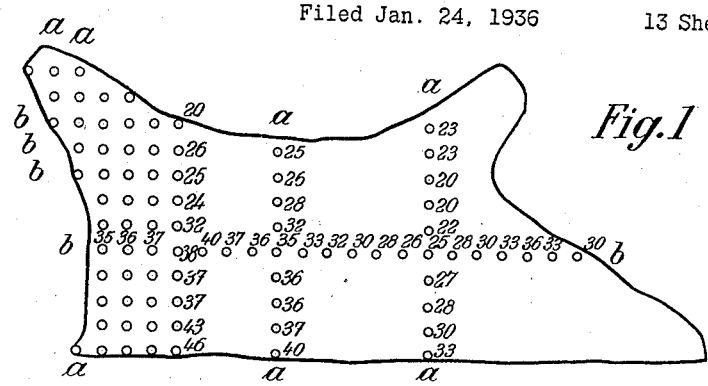
Fig.1
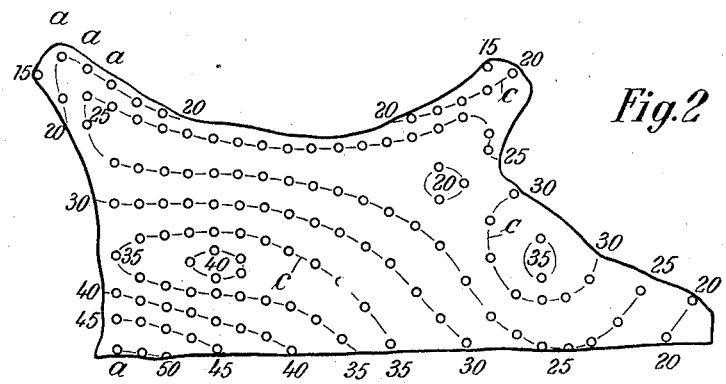
Fig.2
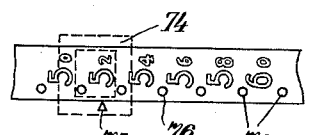
Fig.10
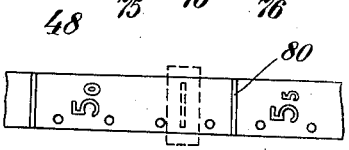
Fig.11
Fig.12
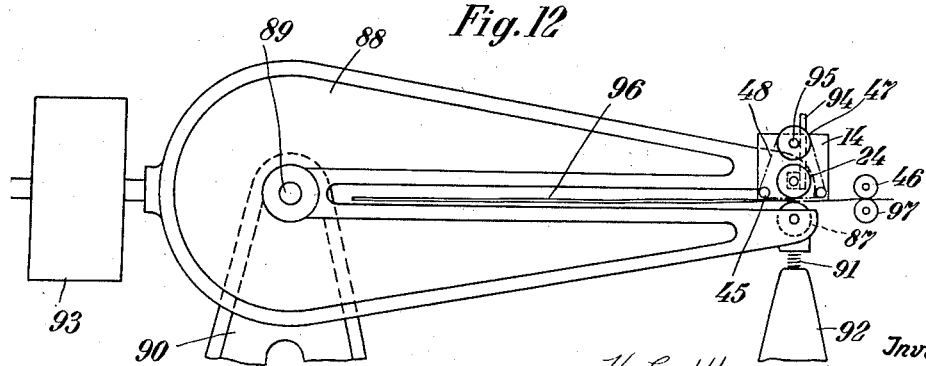
Inventor:
H. E. Kleinschmidt
By Glascock Downing & Seebold
Attys.

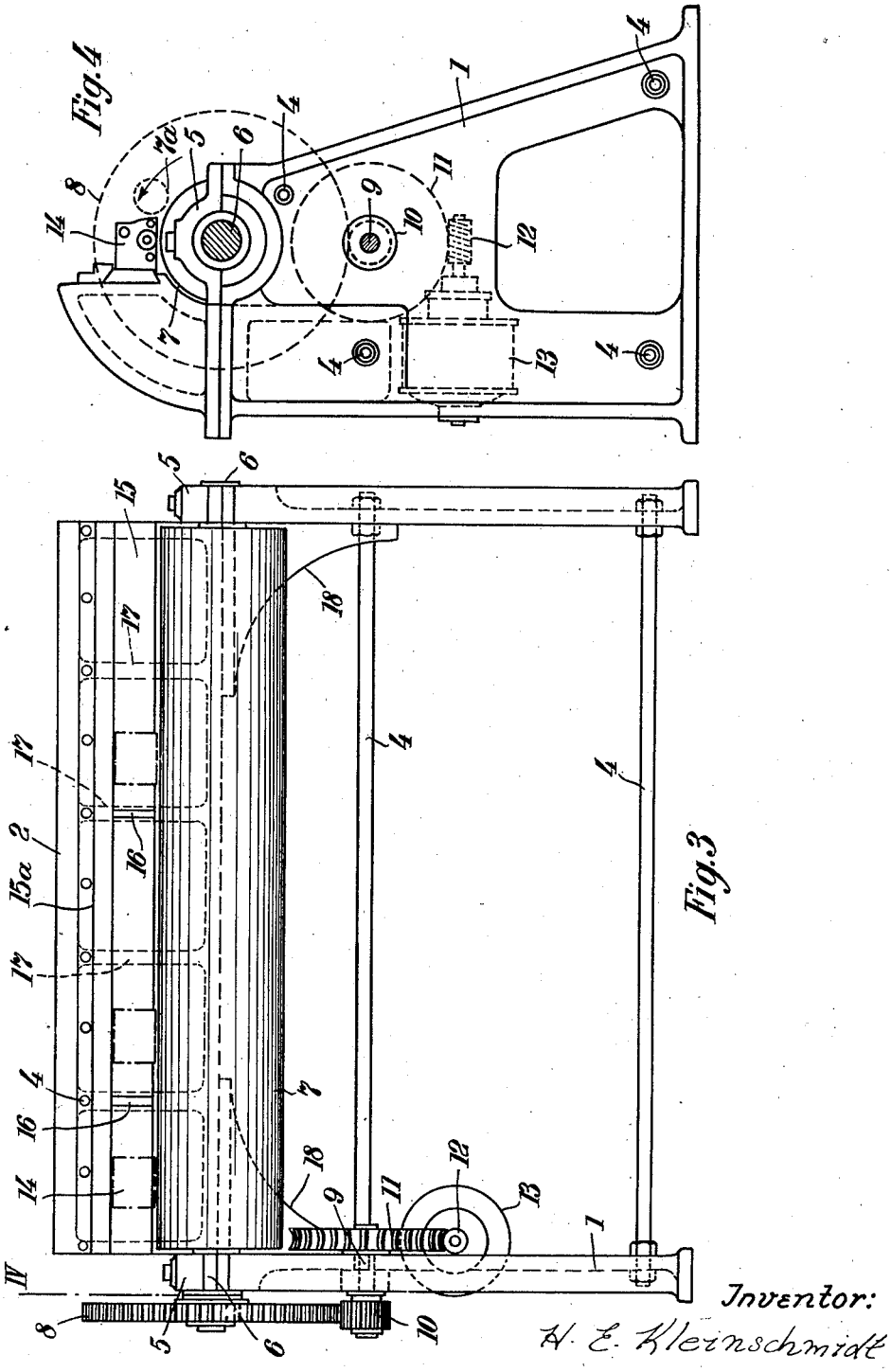

July 5, 1938.  H. E. KLEINSCHMIDT  2,122,945
METHOD OF AND MACHINE FOR MARKING LEATHER OR THE LIKE
Filed Jan. 24, 1936  13 Sheets-Sheet 3
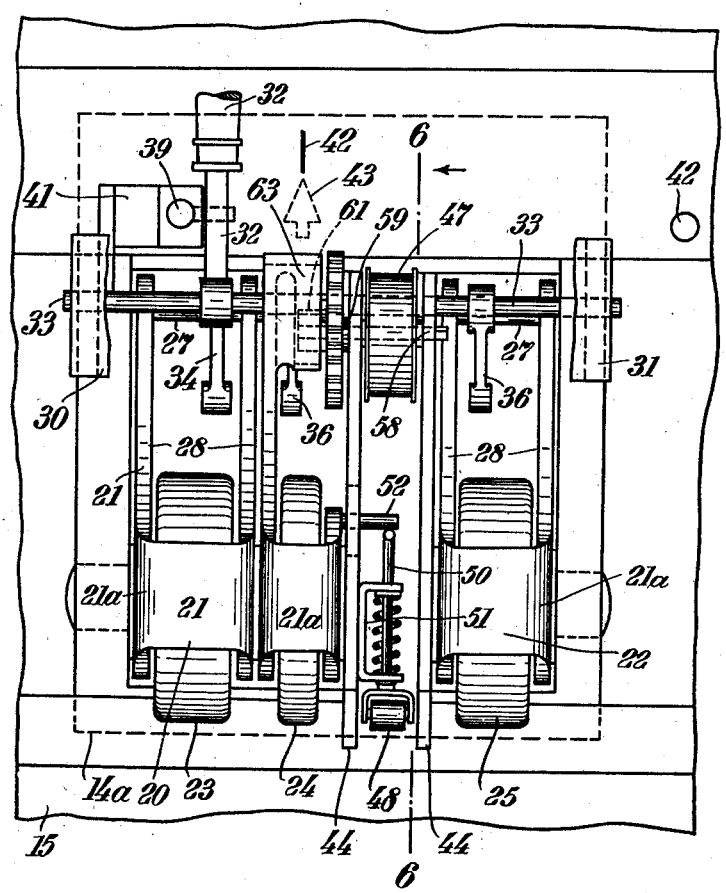
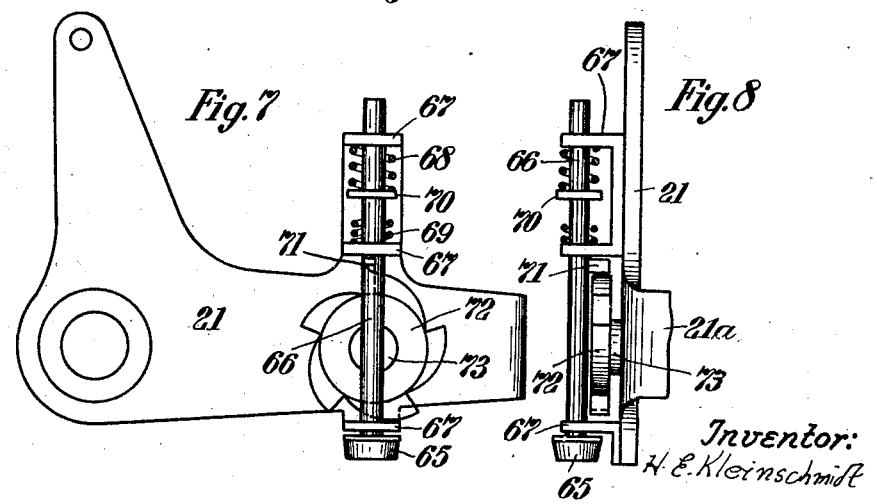
Inventor:
H. E. Kleinschmidt
By: Glascock Downing & Seebold July 5, 1938.  H. E. KLEINSCHMIDT  2,122,945
METHOD OF AND MACHINE FOR MARKING LEATHER OR THE LIKE
Filed Jan. 24, 1936   13 Sheets-Sheet 4
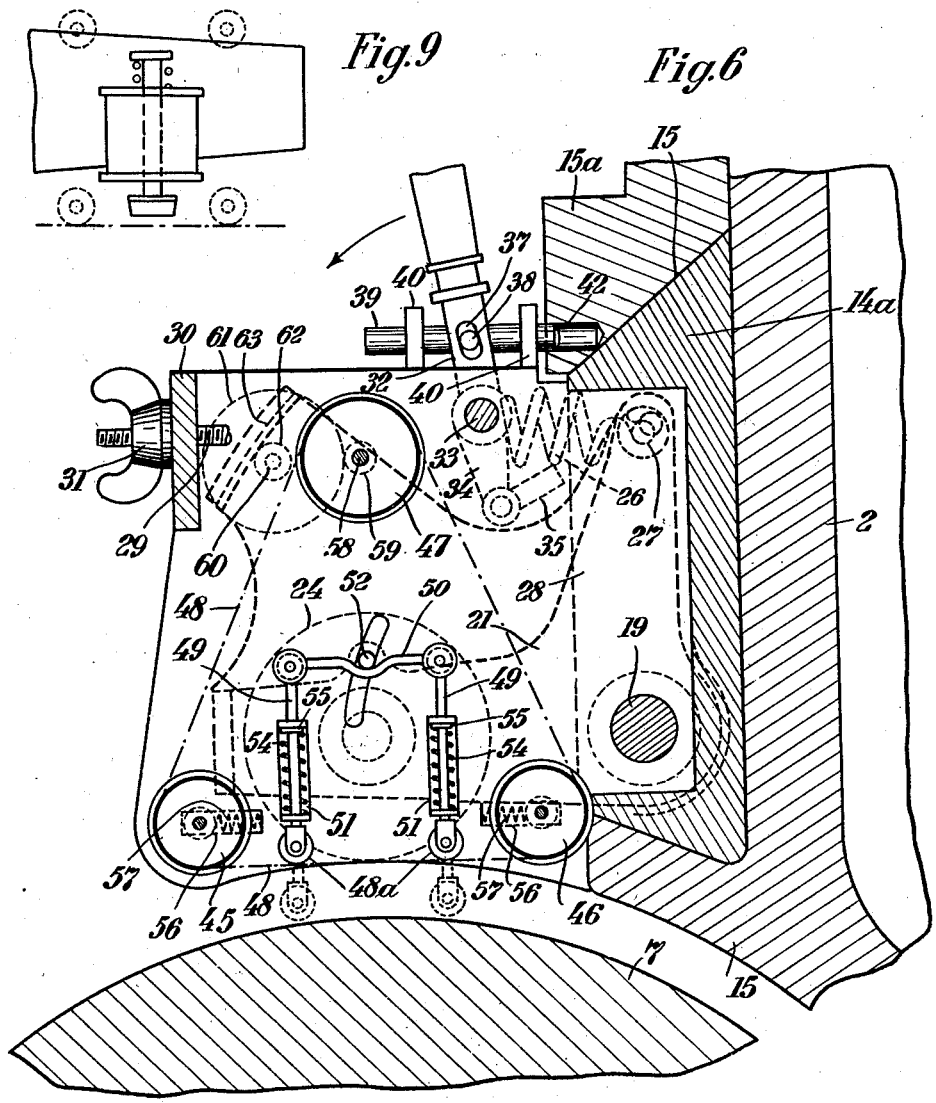
Inventor:
H. E. Kleinschmidt
By: Glascock Downing Seebold
Attys.

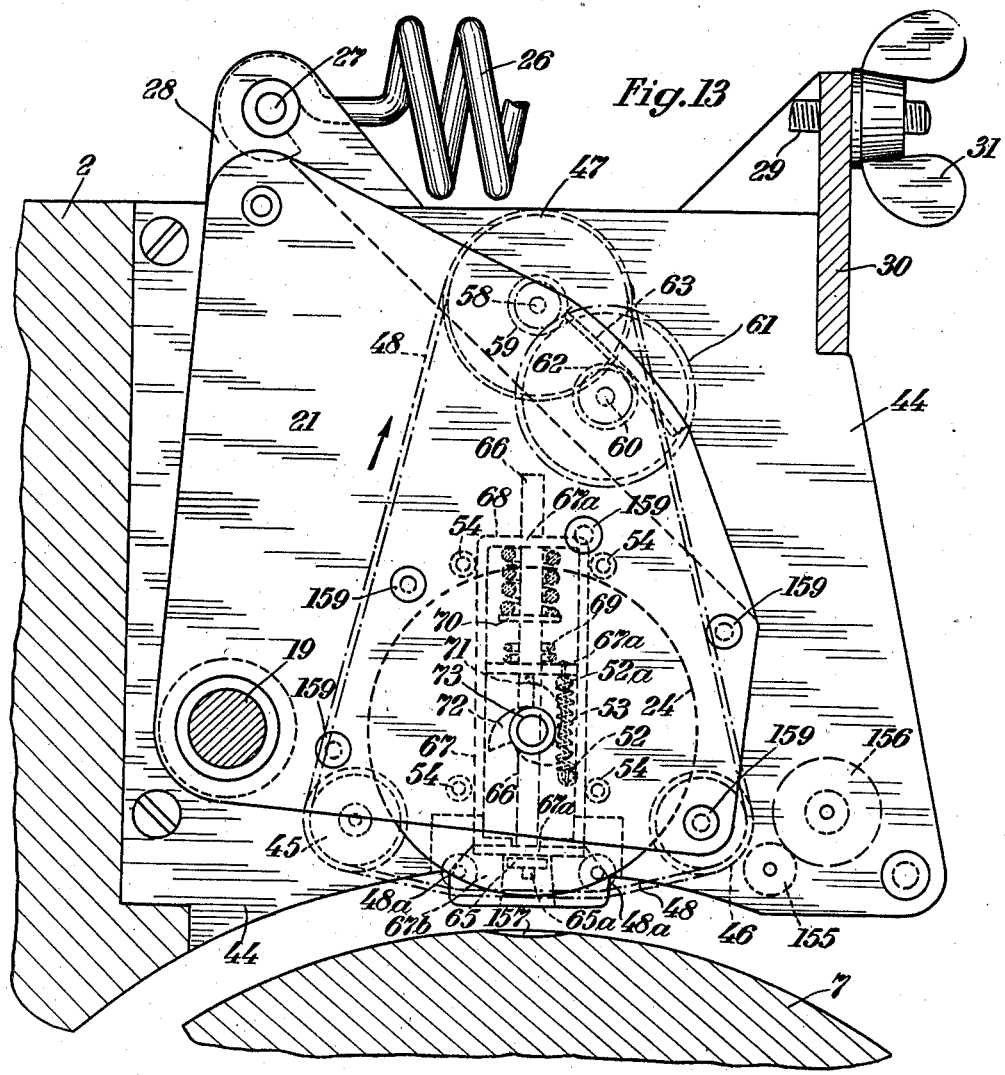

July 5, 1938.  H. E. KLEINSCHMIDT  2,122,945
METHOD OF AND MACHINE FOR MARKING LEATHER OR THE LIKE
Filed Jan. 24, 1936  13 Sheets-Sheet 6
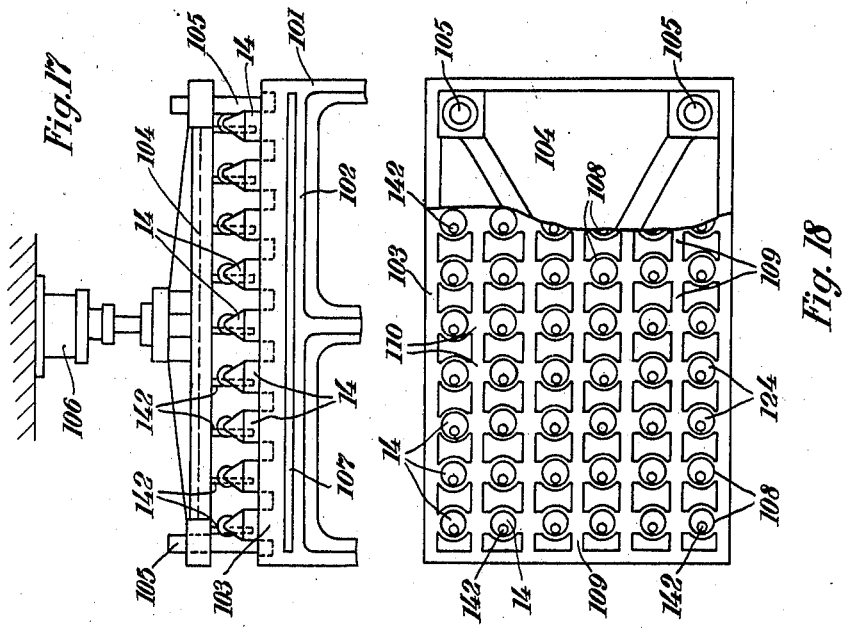
Inventor:
H. E. Kleinschmidt
By: Glascock Downing & Seebold
Attys.

July 5, 1938.   H. E. KLEINSCHMIDT   2,122,945
METHOD OF AND MACHINE FOR MARKING LEATHER OR THE LIKE
Filed Jan. 24, 1936   13 Sheets-Sheet 7
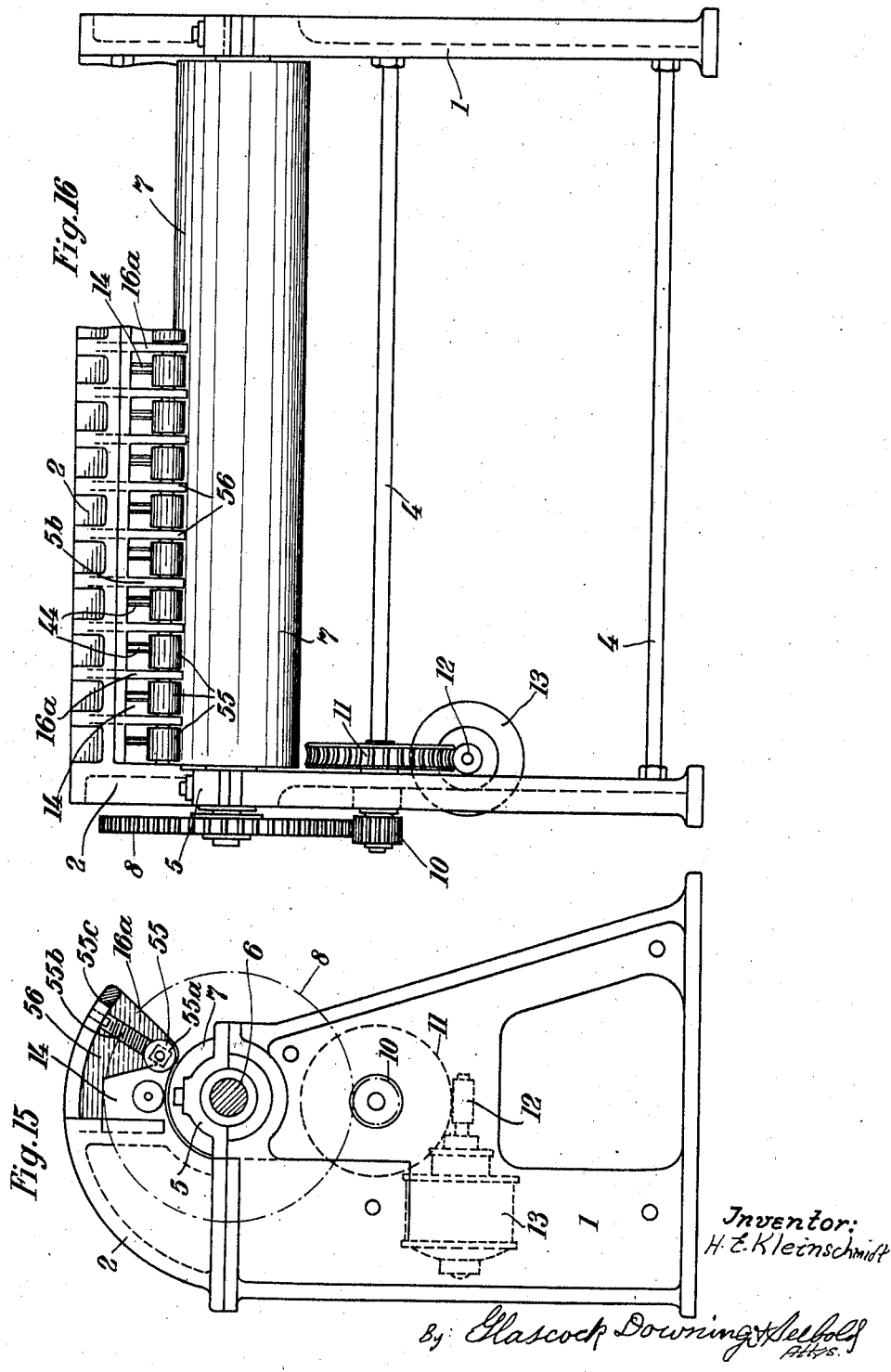
Inventor:
H. E. Kleinschmidt
By Glascock Downing & Seebold
Attys.

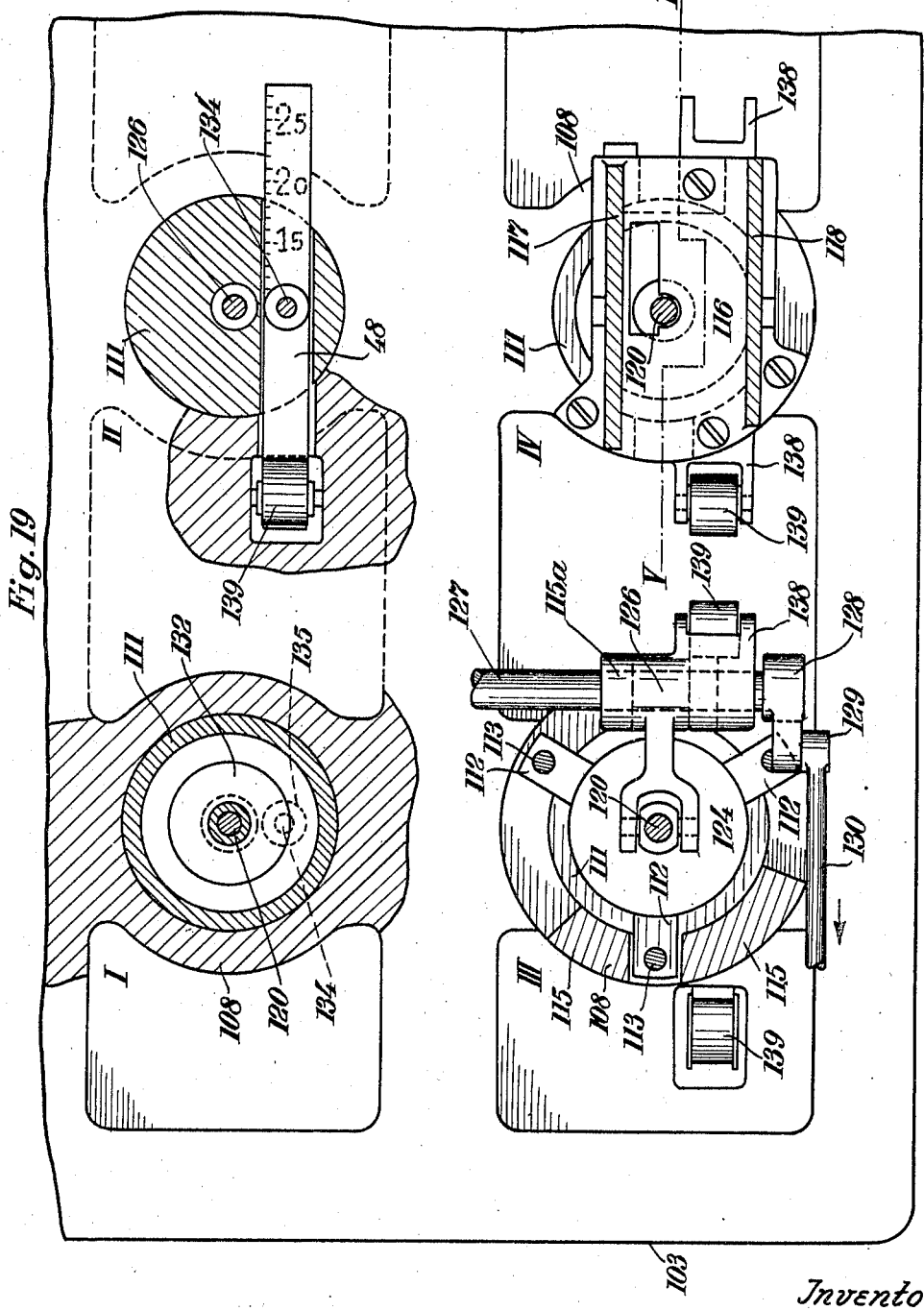

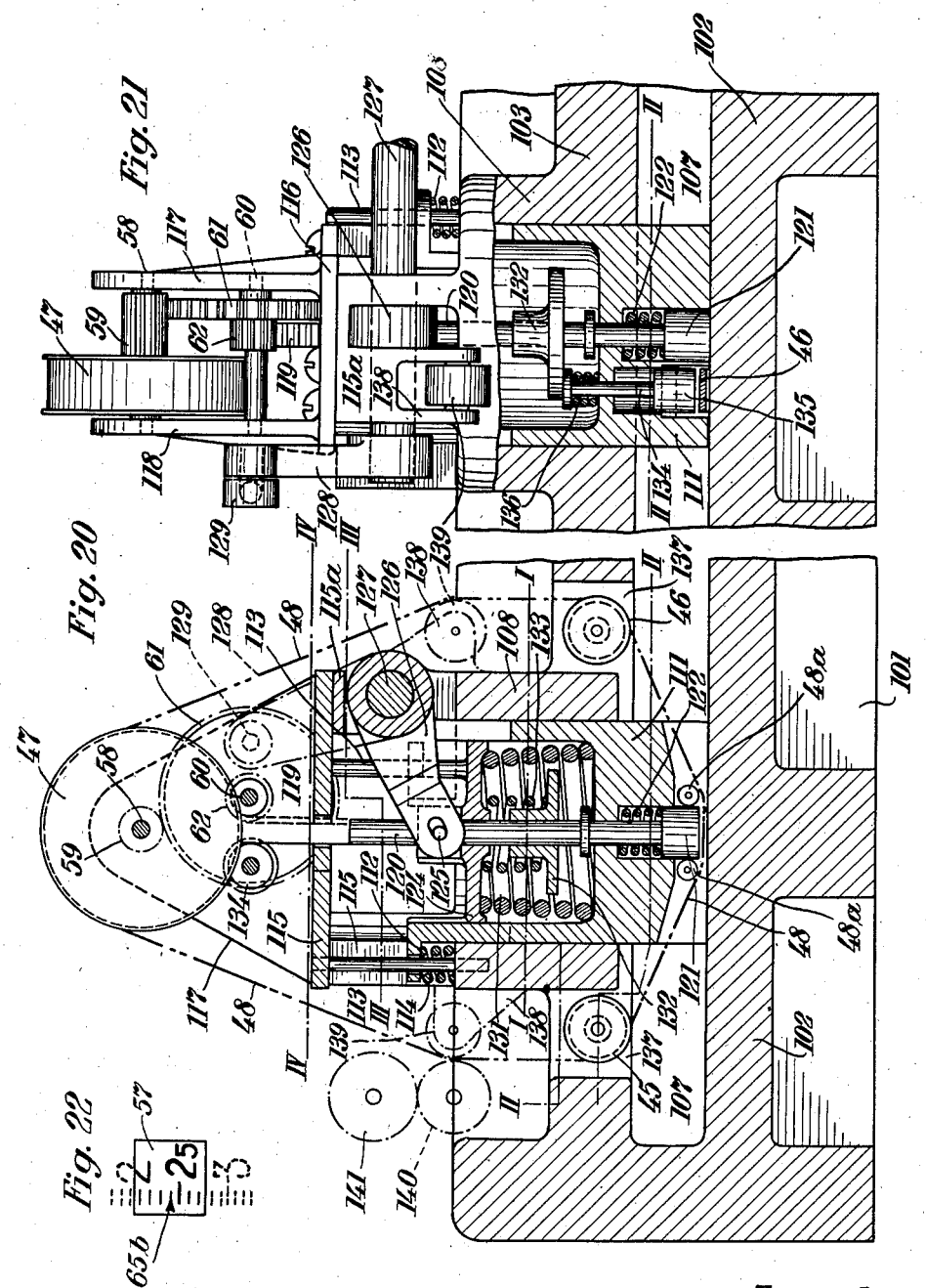

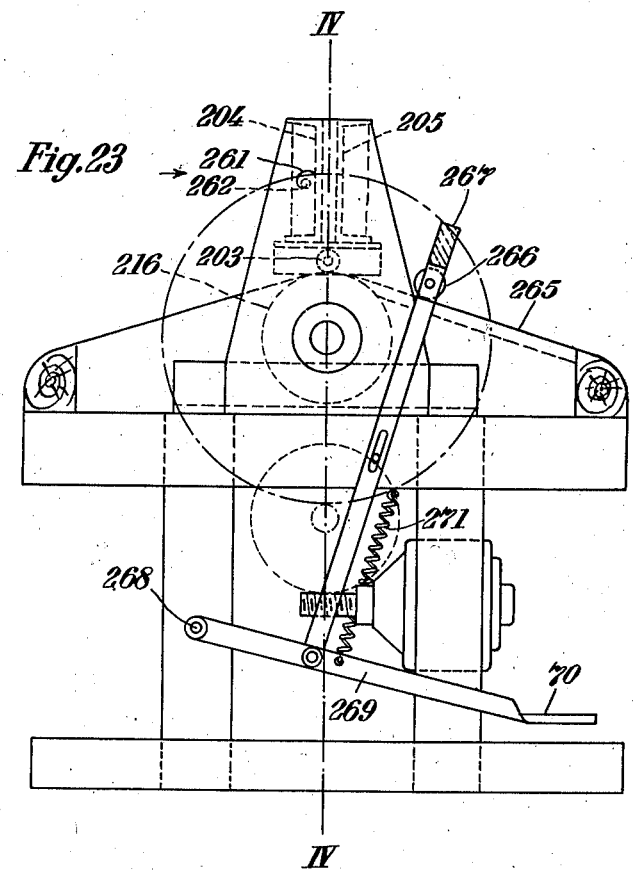

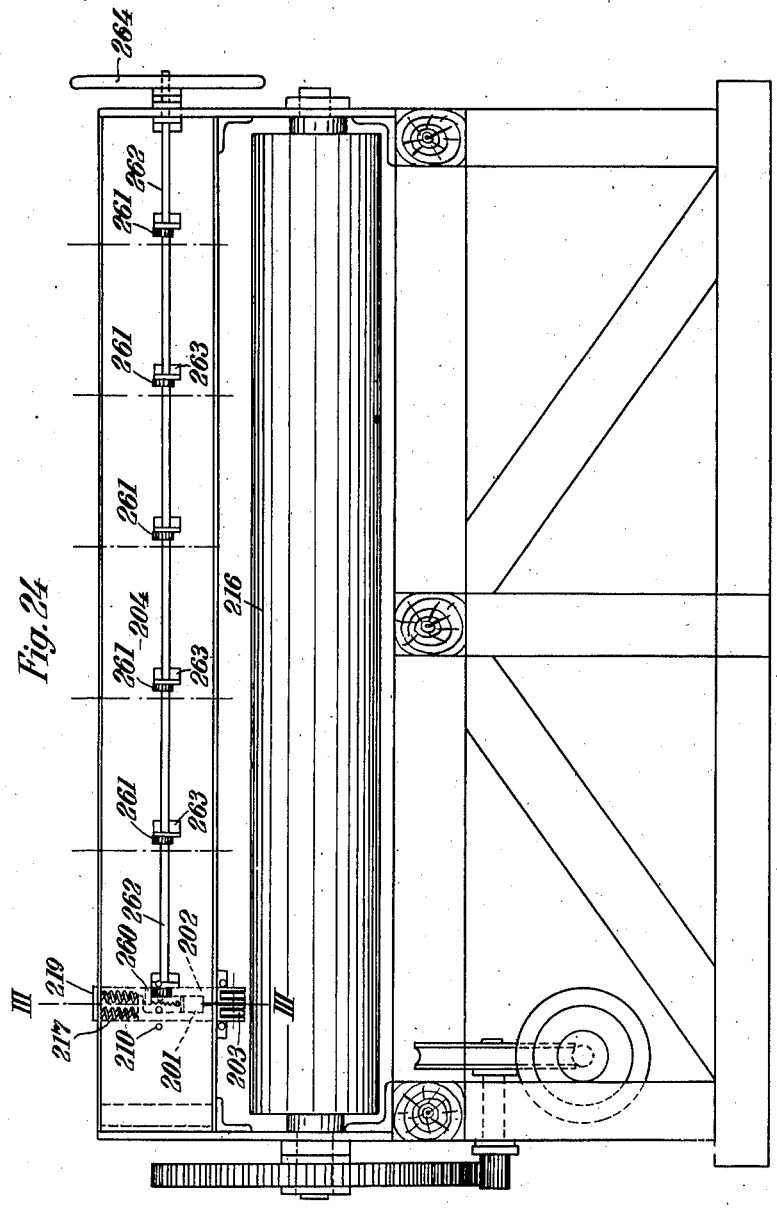

July 5, 1938.   H. E. KLEINSCHMIDT   2,122,945
METHOD OF AND MACHINE FOR MARKING LEATHER OR THE LIKE
Filed Jan. 24, 1936     13 Sheets-Sheet 12
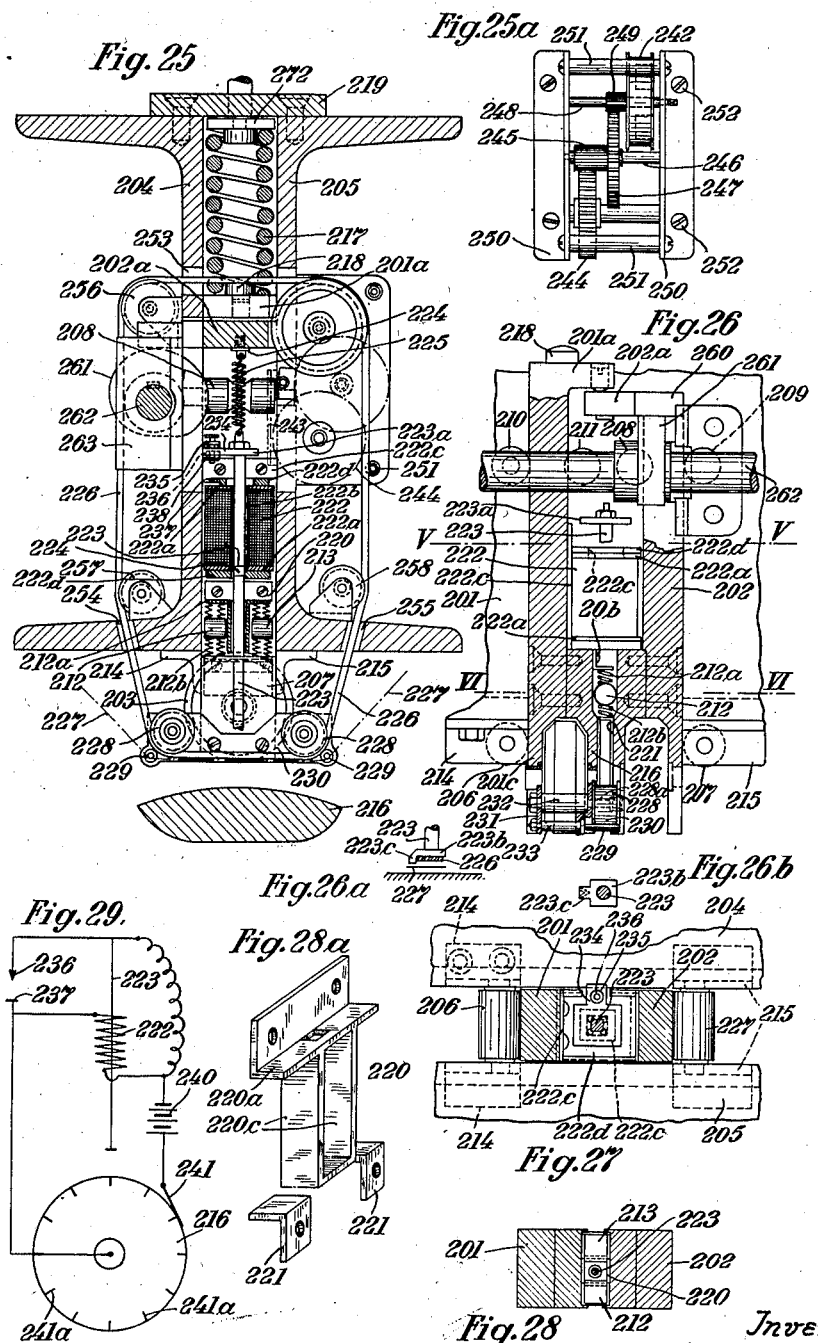
Inventor:
H. E. Kleinschmidt

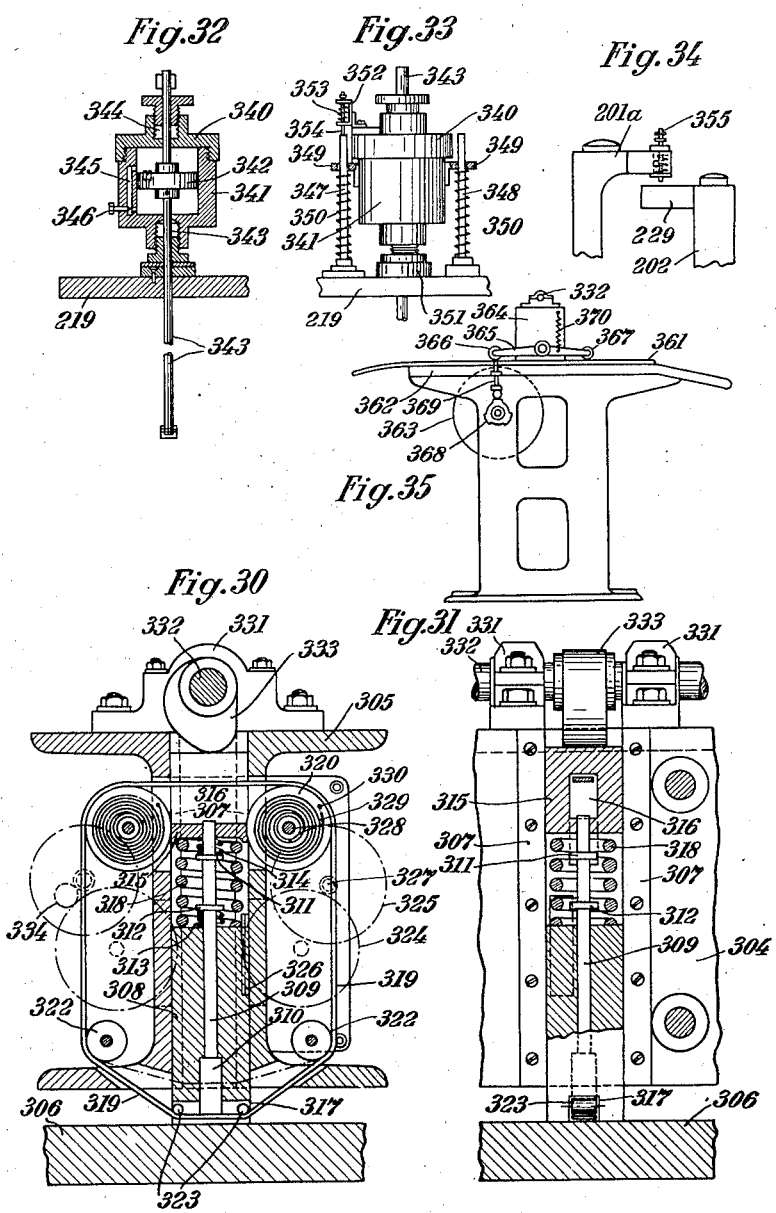

Patented July 5, 1938

2,122,945

UNITED STATES PATENT OFFICE 2,122,945

METHOD OF AND MACHINE FOR MARKING LEATHER OR THE LIKE

Hans Erich Kleinschmidt, Berlin, Germany

Application January 24, 1936, Serial No. 60,687
In Germany January 26, 1935

39 Claims. (Cl. 101—42)

My invention relates to machines for determining the thickness of sheet material, especially large pieces of leather at a plurality of points and for applying to the material at the places in question the particulars of the thickness ascertained.

Machines of this type are known in which the sheet material is placed upon a support and is brought into contact with a reciprocable feeler, which is operatively connected to a type carrier through a step-up transmission mechanism, which displaces the type carrier proportionately to the distance of the feeler from the support on which the sheet material lies, in such a manner that the position of the type carrier is altered as the distance of the feeler from the support varies due to differences in the thickness of the material, the displacement of the type carrier being a multiple of that of the feeler owing to the step-up transmission of the movement of the feeler. The type carrier is arranged over a printing point which lies closely adjacent to the point at which the feeler comes into contact with the material being measured (measuring point), and is adjusted by the feeler through the said mechanism, so that the particular type corresponding to the distance of the feeler from the support and to the thickness of the material being measured at the point in question is caused to lie over the printing point. The type in question is caused to make the impression upon the material being measured by lowering the type carrier. If the machine is provided with a plurality of such aggregates comprising a feeler, a type carrier, a transmission mechanism operatively connecting the feeler to the type carrier and a printing device for lowering the type carrier arranged in a series transversely to the direction of feed of the material being measured and the printing devices are brought into operation at suitable successive intervals, then during its passage through the machine, the material being measured is printed upon at various points distributed over its surface with figures or other particulars of the thickness of the material at the points in question.

The machine forming the subject of the present invention differs from the machines above referred to mainly in the construction, arrangement and mode of operation of the type carrier, the feelers, the printing devices and the mechanisms connecting these parts to one another as well as in their co-operation with one another and in the construction, mode of driving and mode of operation of the entire machine. By means of the improvements acording to the invention, the machine is rendered particularly suitable for the treatment of all kinds of leather, even the heaviest and most refractory sole leathers. Further, the accuracy of measurement and the speed of operation is improved and a more compact arrangement of the bank of impression points is rendered possible. On the other hand, the cost of manufacture of a machine according to the invention is smaller than that of the known machines in spite of its special advantages. Other advantages and features of the invention will be disclosed in the description of the invention with reference to the accompanying drawings.

In the drawings, Figures 1 and 2 show two different ways of marking the skins in plan, while the other figures show various constructional forms of the machines provided with the improvements according to the invention as well as details thereof; Figs. 3 and 4 illustrate the machine in a front view and in a side view; Figs. 5 and 6 illustrate in an enlarged scale the actual measuring and printing device in a side view and in a vertical section according to the line 6—6 of Fig. 5. Figs. 7 to 11 illustrate details of the measuring and printing device, which details will be fully explained in the following specification.

Fig. 12 illustrates another possibility of execution.

Figs. 13 to 16 represent a third mode of execution. Figs. 13 and 14 show one of the measuring and marking aggregates in the manner of illustration corresponding with Figs. 6 and 5 respectively, with the difference that the section shown in Fig. 13 is shifted somewhat farther to the left and illustrated as a view seen from the left. Figs. 15 and 16 correspond in the manner of illustration with the Figs. 3 and 4 respectively. Figs. 17 to 21 show a special embodiment of a machine, in which the measuring and marking or printing devices are brought near to the goods to be measured, said goods being maintained in repose during the measuring and marking operation. Figs. 17 and 18 show the respective machine as a whole in a side-view, and in a top-view respectively. Figs. 19 and 20 illustrate the actual measuring and marking devices in an enlarged scale; Fig. 19 shows especially horizontal sections in the levels indicated by the lines I—I, II—II, III—III and IV—IV of Figs. 20 and 21, such individual sections being designated in Fig. 19 with I, II, III and IV respectively. Figs. 20 and 21 illustrate one of the measuring and marking devices in two vertical axial sections directed rectangularly to each other and in side-view respectively, Fig. 22 shows a detail.

Figs. 23 to 29 illustrate a further mode of carrying the invention to practice. Fig. 23 is a side-view of this machine as a whole, Fig. 24 is a front view; Fig. 25 is a vertical section on an enlarged scale of the upper part of the machine according to the line III—III of Fig. 24; Fig. 25 shows a detail; Fig. 26 is a vertical section through one of the measuring and marking aggregates in the plane of IV of Fig. 23; Figs. 26a and 26b show details of the printing bolt; Fig. 27 is a horizontal section according to the line V—V and Fig. 28 a section according to the line VI—VI of Fig. 26; Fig. 28a shows a detail, and Fig. 29 is a diagram of connections.

Figs. 30 to 35 illustrate a last form of the machine. Fig. 35 shows in a more conventional manner and small scale the machine as a whole in a side-view; Figs. 30 and 31 represent vertical axial sections through the measuring and printing devices proper; Figs. 32, 33 and 34 show details of devices to prevent the printing operation in certain cases, such devices being adapted especially for the application in connection with the machine illustrated in Figs. 25 and 26.

The machine shown in Figs. 3 and 4 has a frame comprising essentially two lateral supports or brackets 1, 1 and of a transverse brace 2 connecting the upper ends of the said supports with each other. The supports 1 which are moreover mutually reinforced by several draw-rods 4 are provided at their upper ends with bearings 5, 5 for the reception of pivots 6, 6 of a cylinder 7 serving as a support for the leather to be worked up and simultaneously conveying the leather through the machine. At the free end of the left sided pivot 6 (Fig. 3) a toothed wheel 8 is positioned gearing into a smaller toothed wheel 10 positioned on a shaft 9. On the other side of the respective support 1 a worm-wheel 11 is mounted on the shaft 9, and the worm 12 of the gear is positioned on the shaft of an electromotor 13 fastened to the support. By this motor which may be provided with a circuit-closing and circuit-breaking switch and also with a device for regulating the speed the cylinder 7 is driven preferably in the direction indicated by the arrow in Fig. 4.

In co-operation with the cylinder 7 are the measuring and printing devices 14, one of which is illustrated in Figs. 5 and 6 in an enlarged scale. In Fig. 3 three of such aggregates are diagrammatically illustrated, but their number is optional. The number depends upon the desired rapidity and exactness of the operation of the machine. In case a hide has to be marked in the desired manner already in a single passage, as many aggregates 14 are necessary as transverse rows a (Figs. 1 and 2) for the imprinting of the values to be measured are desired. In the case that customers are satisfied with passing the hide several times through the machine, the number of the measuring and printing aggregates may be correspondingly decreased.

The aggregates 14 are adapted to be shifted in a dovetail guide 15 which is provided in the transverse brace 2, and which extends in the whole length thereof. According to Fig. 3 the cheeks of the guide 15 are connected with each other at two points by transverse ledges 16, 16 to increase the strength of the said cheeks. Also the traversing brace 2 is of a strong construction and provided with several strong reinforcing ledges 17; the brace is further connected by screws with the side-faces of the supports 1 through the intermediary of brackets 18.

Now the measuring and printing aggregates 14 may be particularly described. It has already been explained that the aggregates are placed as units in a slide which, as shown in Fig. 5, has the shape of a flat box 14a the upper and lower exterior walls of which are slanting in correspondence with the dovetailed cross-section of the guide 15, as shown in Fig. 6. The lower part of each of the slides is traversed by a strong shaft 19 which serves as a support for three oscillating frames 20, 21 and 22. These frames the side-cheeks of which have as shown in Fig. 6 the shape of bell crank levers, which cheeks are connected in each frame at their front portions by ledges 20a, 21a, 22a, contain in their horizontal side-pieces the bearings for rollers 23, 24 and 25 of which the roller 24 serves for the feeling of the leather to be passed between the said roller and the cylinder 7. The rollers 23 and 25 have the purpose of pressing the leather portions near the measuring roller 24 forcibly against the supporting cylinder 7 and to keep the leather in this way in a smooth condition, so that the distance of the measuring roller 24 from the cylinder 7 is always an exact measure of the thickness of the leather at the respective point. During the operation of the machine also the measuring roller 24 must lie close to the leather under a certain pressure. The rollers are pressed against the counter-surface by coiled springs of which only one is illustrated at 26 of Fig. 6 for a better clearness of the drawing. The spring is fixed with its one end to a cross-bar 27 connecting with each other the upper ends of the two vertical side-pieces 28 of each of the oscillating frames 20, 21, 22. The other end of the spring is connected with a screw 29 passing through a rail 30, and having at its exterior end a winged nut 31 by the tightening of which the tension of the spring is regulated. The rail 30 which is supposed to be broken off in Fig. 5 forms the connecting ledge of a horizontally arranged bent piece the side parts of which are fastened to the upper corners of the slide 14a.

For the purpose of clearing the rollers 23, 24 and 25 away from the leather or from the cylinder 7 a device is provided which renders possible a clockwise rotation of the oscillating frames carrying the rollers (Fig. 6). This is effected by means of a hand-lever 32 which is positioned on a shaft 33 extending transversely above the slide 14a, and having its bearings in the side portions of the rail 30, the lower arm 34 of the said hand-lever being connected by a rod 35 with the transverse bar 27 of the appertaining oscillating frame 20. On the shaft 33 two other levers 36 corresponding with the lever-arm 34 are positioned which levers influence the cross-bar 27 of the oscillating frames for the rollers 24 and 25. The upper arm of the lever 32 is provided with an oblong aperture 37 into which the laterally projecting pin 38 of a bolt 39 fits which is guided in ears 40, 40 of a support 41 positioned on the left side-portion of the piece 30, which bolt 39 is adapted to catch into apertures 42 provided in a corresponding level in the upper cheek 15a of the slide-way, so that the slide may be locked in the respective position relatively to the slide-way.

In the slide-block 14a two vertical plates 44, 44 are fastened in a small distance from each other preferably by screws to a vertical transverse ledge of corresponding thickness which is integral by casting to the slide-block. These two plates principally serve as bearings of three rollers 45, 46 and 47 of which only the upper roller 47 is illustrated in Fig. 5 for the reason of simplifying the drawing. The rollers 45, 46 and 47 serve for the reception of an endless band 48 which in the illustrated embodiment forms a stencil-band which is provided in certain regular distances with perforations representing numerals or other marks of the thicknesses to be measured. For marking for instance neat's leather the intervening values may be graduated in correspondence with the usual thicknesses from 2 to 10 millimetres. In this connection intervening values of 0,2 millimetre may for instance be provided. As shown in Fig. 6 the stencil-band is in close proximity of the surface to the leather near the point at which the measuring roller 24 touches the leather. By depressing a stamp which either carries a colour-padding or co-operates with a colour-band arranged above the stencil-band the numeral of the stencil-band being for the time at the measuring point is printed on the leather. The details of this device are described further below.

For a continual conformation of the level of the stencil-band to the thickness of the leather, this means for a close passage of the band above the surface of the leather in a constant distance at varying thickness two special small guiding rollers 48a are provided the bearings of which are not fast as the bearings of the rollers 45, 46, 47 but adapted to take part in the movement of the oscillating frame 21 of the measuring roller 24. For this purpose the rollers 48a are mounted on the lower ends of the side-pieces 49 of a piece 50 which is guided in ears 51, 51 of sheet metal in a vertical direction. These ears are fastened on the left-sided plate of several plates 44 being integral with the slide 14a (Fig. 5). A pin 52 laterally projecting from the horizontal side-piece of the oscillating frame of the roller 24 extends through a slot 53 of the respective plate 44 and engages a bent portion of the transverse ledge of the piece 50. Springs 54, 54 are provided the lower ends of which are supported by respective guiding ears 51, and the upper ends of which lie close to a flange 55 of the side-pieces 49 of the piece 50, and by the said springs the piece 50, and with it the guiding rollers 48a are forced upwards, so that the horizontally directed portion of the stencil-band 48 between the said guiding rollers takes in the upwardly and downwardly directed movement of the pin 52 and of the measuring roller 24. For continually tightening the stencil-band 48 the bearings of the rollers 45 and 46 are guided in horizontal slots 56, 56, in which they are forced outwards by springs 57, 57. In the case that a special colour-band 58 passing closely above the lower part of the stencil-band is employed, as mentioned above, the colour-band is not only guided by the rollers 48a but also by two other rollers which are mounted on the upper corner of the piece 50, as indicated in Fig. 6. The colour-band takes then part in the displacement of the stencil-band 48.

On the shaft 58 carrying the roller 47 a small toothed wheel 59 is positioned gearing with a larger toothed wheel 61 positioned on a shaft which is also mounted in the plates 44, 44. On the shaft of the said toothed wheel, a smaller toothed wheel 62 is positioned which gears with a toothed segment with internal gear 63. This toothed segment is positioned on the left side-piece of the oscillating frame 21 for the measuring roller 24 (Fig. 5). The curvature of the toothed segment 63 corresponds with an arc the center of which is the axis of the shaft 19. In this way the rocking movement of the frame carrying the measuring roller 24 and also the upwardly and downwardly directed movements of the said roller, which movements correspond with the variations of thicknesses of the leather displaced below the said roller are transformed into a rectilinear movement of the stencil-band 48 with the ratio of the gears 59, 61, 62, 63. This band is adjusted relatively to the point in which the measuring roller 24 touches the leather, this means relatively to the point of imprintment in such a way that of the several numerals forming perforations in the stencil-band the numeral corresponding with the respective value of thickness will coincide with the said point. By subsequently depressing by means of a suitable marking or tapping device the mentioned colour-band passing above the stencil-band and between the guide-rollers 48a the respective numeral is imprinted on the leather. This imprinting is not executed exactly at the measuring point which is touched by the roller 24, but this small lateral deviation is not of practical importance.

In Figs. 10 and 11 a portion of the employed stencil-band is illustrated, and Fig. 10 shows the band for an execution of the method according to Fig. 1, whereas Fig. 11 shows a band which preferably is employed in the case that the leather is imprinted according to the method shown in Fig. 2.

The printing device provided in the first case is particularly illustrated in Figs. 7 and 8 in a side-view and a front-view. It is assumed that the printing device is fixed to the left side-piece of the oscillating frame of the smoothing roller 25 (Fig. 5), as the said printing device must take part in the upwardly and downwardly directed movements of the stencil-band relatively to the leather. The printing device might also be fixed to the right side-piece of the oscillating frame of the measuring roller 24. In both cases the respective plate 44 must be provided with an opening through which the guiding parts positioned on the side-piece 21 may extend into the space of the printing device between the two plates 44. In Fig. 5 the printing device is left out for the purpose of a better clearness of the drawing. As shown in Figs. 7 and 8 the printing device comprises a stem 66 provided on its lower end with a yielding padding 65, which stem is guided in three ears 67 fixed to the oscillating frame 21. Between the two upper ears 67 two coiled springs 68, 69 are arranged of which the upper one is supported at its lower end by a flange 70. Below the intermediate ear 67 a projection 71 is provided projecting laterally from the stem 66, which projection co-operates with a cam wheel 72 positioned on the axis 73 of the smoothing roller 25. In the present case the wheel 72 is provided with five cams, so that at each revolution of the roller 25 the stem 66 is lifted five times, and after the respective cam has passed the projection 71 the said stem is always urged downwards by the spring 68, whereby in co-operation with the stencil-band 48 the imprinting is executed on the leather. After the imprinting the stem is lifted somewhat by the lower spring 69. By substituting a cam-wheel with a larger or smaller number of cams the number of imprintings for each revolution and with the distance of the prints in the transverse lines a (Fig. 1) may be altered at will.

As shown in Fig. 10 the values of thicknesses on the stencil-band are graduated with a divergence of 0.2 millimetre. Above the stencil-band a screen 74 is preferably provided the window of which has a breadth (in the direction of the movement of the band) which is about 1½ times the distance of the numerals on the band. Preferably the stencil is provided on its margin with a triangular perforation 75 which designates the exact level of the point of measurement and which is imprinted on the leather. Further the apertures 76 between two numerals produce on the leather points beside the imprinted numerals. From the distance of these points nearest to the mark 75 the exact measuring record lying between the two printed numerals may be ascertained by interpolation. The apertures 76 may simultaneously serve for the engagement by driving pins provided on the roller 47 which pins ensure the positive drive of the stencil-band by the roller 47.

Preferably the roller 47 is not absolutely fast on its shaft 58 but is fitted on the shaft under high friction, so that a mutual rotary movement is possible. For facilitating this rotary movement the shaft 58 is for the purpose lengthened beyond the right bearing plate 44 (Fig. 5) and is at that end four-edged to apply a wrench or key thereon. By rotation of the shaft 58 relatively to the roller 47 the measuring and printing device may necessarily be adjusted either for levelling down inaccuracies arising in the displacement of the slide 14a or for other causes or for accommodating by a compensating displacement of the stencil-band to the fact that, as mentioned above the points of imprintment do not correspond exactly with the measuring points.

In Fig. 9 a printing device is illustrated which is principally provided for a distribution of the points of imprinting according to Fig. 2 but which may also be used for the distribution according to Fig. 1. Here the imprinting is executed by electromagnetic means. The stem 66 forms the core of a solenoid 78 which is fixed to the oscillating frame 22. The stem is afterwards forced upwards by a spring 79. In the circuit of the coil of the solenoid beside a battery 81 a fixed contact 82 is provided which is closed by contact strips 80 (Fig. 11) as soon as during the travel of the band one of the strips passes the first-mentioned contact. The contact strips are for instance arranged on the band in distances corresponding with the mutual distances of the numerals of the stencil, and the first-mentioned fixed contact is arranged in such a way that the circuit is closed and through this effect the stem 66 pressed upon the stencil-band, as soon as one of the numerals appears on the level of the point of measurement. By occasioning that near the end of its downward motion the stem 66 opens an additional contact in the circuit it is easily achieved that the depressing of the stem only takes place instantaneously, so that also in the case that the thickness of the leather passing the machine should not vary during a certain period no daubing of the stencil-imprints may take place. The colour band may be of different colour for the printing implements acting in the different zones (rear part or butt, true part of the back, neck), so that imprints of the measured values result which are on the respective parts of the leather of different colour. Also in the case that the length of the colour-band 58 is adjusted to the operative portion of the stencil-band this means to the portion of the band occupied by numerals, one section of the colour-band may have a colour different from that of the other section, for instance the section corresponding with the portion of the stencil-band occupied by the numerals 2 to 3 may be of black, and the remaining section may be of blue colour. Correspondingly the low measured values are printed in black colour, and the high values in blue colour, such printing resulting in the above mentioned different marking of the zones of the belly and the back as the values of thicknesses on the belly are generally smaller than those on the back.

After all in the working up of complete halves it is naturally not necessary to feel the leather in lines which are directed transversely to the vertebral line; the point of measurement and imprinting may on the contrary also be arranged in lines which are parallel to the vertebral line or form with it an angle of more or less pronounced acuteness, this being especially the case for the distribution of the points of measurement shown in Fig. 1. This is especially desirable for the working up of especially large pieces of leather which are not easy to handle in the case that the passage through the machine is directed transversely to the vertebral line.

The leather is worked up in such a way that for instance half a hide is fed with the belly portion in front between the cylinder 7 and a counter-cylinder designated in Fig. 4 with 7a, the said counter-cylinder being for the purpose positively driven with a corresponding velocity, so that the half hide is brought by the cylinders underneath the rollers of the measuring and printing aggregates 14. Thereby the measuring of the thickness and the printing of the measured values is executed in transverse lines a the number of which corresponds with the number of the actual aggregates. In the case that there are as many aggregates as measuring lines are desired a half of a hide is readily marked after a single passage through the machine. In the case, however, that the machine is equipped with a smaller number of aggregates 14, the leather must correspondingly pass the machine repeatedly, the passages being executed one after the other, and every passage after a lateral displacement of the aggregates.

The new method is naturally not confined to the working up of leather but can also be used for other sheet material, such as for instance for pasteboard, sheet metal and the like. In the case of an especially stiff and more or less undulated material it might be preferable not to use as support for the material an undivided and uninterrupted cylinder or the like but as shown in Fig. 12 to provide for each measuring roller 24 a particular counter-roller 87 the bearing of which forms a rigid unit with the carrier of the measuring roller. In the embodiment according to Fig. 12 the rollers 24 and 87 are mounted at the ends of the shanks of a casting 88 which corresponds in shape with the frame of plate-shears, the said casting being adapted to swing at its opposite end about a shaft 89 which is mounted in a bearing 90. With the free end of its lower shank the body 88 rests on a support 92 by the intermediary of a spring 91. A considerable reduction of the upwardly and downwardly directed movements of the body 88 by the weight of its front part carrying the measuring and printing device is avoided by a counter-weight 93. The measuring and printing device 14 may substantially be constructed in accordance with the corresponding device of the first embodiment described above. In correspondence with the vertical guide of the measuring roller 24 the transformation of the measuring movement into the shifting movement of the stencil-band 48 is effected by means of a rack 94 on the vertically bearing 93 of the roller 24, which rack gears into a pinion 95 of the driving roller 47 of the stencil-band 48 which is held by the rollers 45 and 46 in a horizontal position and in a tightened condition above the leather 96 introduced between the rollers 24 and 87. The leather is preferably with its belly-portion in front again passed between the rollers 24 and 87 by means of rollers 97.

Also in this case either as many measuring and printing aggregates, each in connection with a body 88, may be provided as there are measuring lines for the leather, or a smaller number may be provided. In the last case the leather must after each passage be laterally displaced relatively to the aggregates for a distance corresponding to that of the measuring lines.

The measuring and marking device illustrated in Figs. 13 and 14 generally corresponds with the devices illustrated in the Figs. 6 and 5. The reference-characters of corresponding parts are the same. An essential difference consists in that the frame 67 on which the auxiliary guide-rollers 48a for the measuring or marking band 48 are mounted is not positively driven by the carrier 21 of the feeler-roller 24 at the downward movement of the latter, but is driven through the intermediary of a spring 53 (Fig. 13) acting on the one hand upon the intermediate transverse ledge 67a of the frame 67 and on the other hand upon a pin 52 which extends through an opening in the left-sided plate 44 (Fig. 14), and is firmly connected with the right-sided plate of the frame or of the bell-crank lever 21 of the feeler-roller 24. A second pin 52a mounted on the left side-piece of the right-sided bell-crank lever 28 of the smoothing roller 25 extends through an opening 158 in the right-sided plate 44 and reaches below the intermediate ledge 67a of the frame 67. The purpose of this arrangement is the following: When passing the leather or the like to be marked-in the machine it may occur that for instance on the left side the leather passes with its left margin by the smoothing roller 23 and the feeler-roller 24, so that the mentioned rollers are therefore in their lowest position, whereas the marking device and the right-sided smoothing roller 25 are on the level corresponding with the thickness of the leather. This would not be possible with respect of the marking device in the case of a direct connection of the frame of the latter and also of the frame forming the bearing of the auxiliary guide-rollers 48a with the bell-crank levers carrying the feeler-roller 24 or the respective smoothing roller 25 as in the case of the embodiment described above.

In the embodiment shown in Figs. 13 and 14 the marking stamp 66 is not guided in a special frame as in the embodiment described above, but in the contrary the frame 67 carrying the auxiliary guide-rollers 48a simultaneously serves for the guide of the stamp 66. The frame 67 is guided between four rollers or pins 54 (Fig. 13) which are arranged in corresponding relative distances between the plates forming the bell-crank lever 21 of the first embodiment. These plates and also the corresponding plates of the bell-crank levers 28 forming the bearings of the smoothing rollers 23 and 25 are rigidly connected with each other by bolts 159. The springs 68 and 69 the arrangement of which is the same as in the embodiment described above, are left out in Fig. 14 for increasing the clearness. The marking band 48 consists in the present case of rubber of such an elasticity that the lower division of the band travelling across the leather may be lowered by the auxiliary guide-rollers 48a without the application of yieldable bearings for the guide-rollers 45, 46. The band 48 is provided with outwardly projecting numerals corresponding with the measure-values to be printed and is further provided with a graduation of measurement (Fig. 22). The band passes by a tinging roller 155 opposite to the guide-roller 46, to which roller 155 the colour is fed from a colour-roller 156. The roller 45 is for the purpose continually pressed under a slight pressure against the band 48. At the lower end of the marking stamp 66 a pressure-plate 65 is provided having on its one side a projection 65a (Fig. 14) the cross-section of which corresponds with the mark designated in Fig. 22 with 65b, and the length and thickness of which projection corresponds with the thickness of the typeband 48. If in the manner described above the stamp 66 moves under the influence of the spring 68 with a jerk downwardly at the snapping of the driver 71 off the respective cam of the cam-disc 72, the type-band 48 is pressed upon the leather, so that the printing is effected at the point of the type-band positioned for the time below the printing plate. Simultaneously the mark 65b (Fig. 22) is printed on the leather by the projection 65a of the printing plate, which projection may also be coloured on its lower side or for which a special colour-band may be provided, this printing being effected on the leather at the continually fixed point lying in a small fixed distance from the actually measured point of the touch of the feeler-roller 24 with the leather. The lower side of that part 67b of the frame which contains the bearing for the auxiliary roller 48 is closed without taking account of a rectangular opening 57 (Fig. 22). Correspondingly only that portion of the type-band 48 is printed which corresponds with this opening. The imprinted characters of the type-band are drawn in Fig. 22 with full lines, whereas the characters which are not imprinted are illustrated in dotted lines. From Fig. 22 it is obvious that it is in this way without a great ratio of transmission possible conveniently to read in the gear transforming the strokes of the feeler-roller or measuring roller 24 into the shifting movement of the type-band 48 fractions of the measured values designated by numerals. In the present case the measuring numbers are graduated from five to five tenths of a millimetre, and the distances between the measuring numerals are also graduated from five to five tenths of a millimetre. The simultaneously printed fixed mark 65b then indicates for instance that the exact measured value is in the case of Fig. 22 about 2,4 millimetres.

In the zero-position of the type-band 48 in which no measuring takes place the measure-numeral zero is below the marking plate 65. During the measuring the band 48 is displaced, as mentioned, in correspondence with the thickness of the leather, and in the present case the said displacement takes place in the direction of the arrow in Fig. 13. Thereby the band 48 only passes with those numerals by the tinging roller 155 which in the zero-position of the band (in the direction of the travel of the band) are in front of the tinging roller. In order to provide also for a colouring of the group of numerals between this point and the point of marking or at least of the numerals of said group which represent higher values a cavity 157 is fraised out of the counter-cylinder 7 oppositely to the measuring roller 24, into which cavity the said roller 24 may dip in the case that there is no leather in the machine. In correspondence with such a lowering beyond the zero-position also the type-band 48 is displaced beyond its zero-position, this means that also the numerals which are ordinarily not touched by the tinging roller are tinged by the roller.

For a very thick leather full of boils the rollers 23, 25 are under circumstances not sufficient to press the leather in a flat condition towards the counter-cylinder 7. In this case special rollers 55 (Figs. 15 and 16) are additionally provided which are arranged in front of the smoothing rollers and mounted in bearings 55a which are displaceable in radial guides and pressed towards the cylinders 7 by strong springs 55c. The guides 55b are arranged in cheeks 56 projecting from the part 2 of the frame to the front. In the embodiment illustrated in Figs. 15 and 16 the measuring and marking aggregates 14 are, however, rigidly connected with the part 2 of the frame. In this case the right-sided smoothing roller (Fig. 14) may in each aggregate be dispensed with, and respectively the measuring roller 24 may directly be arranged adjacent the right side of the last-mentioned smoothing roller, so that the points of marking may be brought closer together (in the direction of the axis of the cylinder).

In the embodiment according to the Figs. 17-21 which is especially adapted for the treatment of a very thick and stiff leather and of leather full of boils the measuring and marking aggregates 14 are distributed in a great number over a plate 103 (Figs. 17 and 18) forming an intervening space 107 in combination with a plate 102 arranged underneath it and supported by a frame 101, the said height of the said intervening space being only somewhat greater than the greatest thickness of the leather or the like to be measured. The goods to be measured are slipped into this slot 107, and the measuring and marking is effected by lowering the measuring and marking elements until they touch the surface of the leather. In order to provide for a tight fitting of the leather to the counter-plate 102 during the measuring also in this case smoothing elements are preferably again provided. The latter consist here of cylindrical bodies 111 (Figs. 19-21) of the shape of hollow pistons which are guided in basements 108 vertically projecting from the plate 103. The guidance is effected not only by the cylindrical bores of the basements 108 but additionally by three ears 112 projecting from the upper edge of the piston 111 through the bores of which ears guide-rods 113 pass which are fastened in the embasements 108. The piston 111 is forced upwards by springs 114 arranged below the ears 112 and coiled around the rods 113. From each of the embasements 108 two pedestals 115 and a bearing 115a project upwardly, and to these parts the base-plate 116 of a frame is screwed, the standards 117, 118 of which serve as bearings for the shaft 58 of the disc 47 and for the shaft 60 of the toothed wheel 61. The toothed wheel 61 is as in the case described above in gear with a pinion 59 of the shaft 58, and a pinion 62 on the shaft 60 gears with a rack 119 forming the upper end of a spindle 120. This spindle carrying at its lower end a piston 121 corresponding with the measuring and feeling roller 24 of the embodiment described before is guided on the one hand in the hollow piston 111 and on the other hand in such a way that a roller 134 mounted in the standards (117, 118) presses it towards the pinion 62. A spring 122 provided in the cavity of the piston 111 forces the feeler-piston 121 downwardly. On the rod 120 a driver having the shape of a disc 124 is guided on the hub-portion of which two pivots 125 are provided being in engagement with two oblong apertures of a forked lever 126 positioned on a shaft 127 which is mounted in a support 115a. As shown in Fig. 19 this shaft extends across the respective row of aggregates in the transverse direction, and as indicated in Fig. 19 for the left-sided aggregate in the front the said shaft carries for each aggregate a lever 128 connected with a rod 130 through the intermediary of a pivot 119. By a mechanism which is not illustrated in the drawings and which may for instance consist of a cam shaft or an eccentric shaft driven by a motor the rods 130 are subjected to a reciprocating motion, so that the levers 126 and with them the discs 124 are to a certain extent moved upwards and downwards. The disc or driver 124 may through the intermediary of a spring 131 influence the piston 111 and may through the intermediary of a second spring 133 of smaller strength influence a second driver 132 which is also guided on the rod 120. The downwardly directed movement of the rods is limited by a flange 123.

The driver 132 serves for the actuation of the marking piston 135 (Fig. 21) which is guided in a bore arranged eccentrically to the bore provided in the piston 111 and receiving the feeler-piston 121, which marking piston extends with its stem 134 into the upper cavity of the piston 111. The upper end of the stem 134 is in the reach of the driving disc 132, so that at a lowering of the said disc the piston 135 is moved downwards against the influence of a spring 136 tending to move the said piston upwardly, through downward motion of the piston 135 the characters provided on the type-band 48 are imprinted upon the leather, the said type band 50 passing underneath the piston.

In Figs. 20 and 21 the respective parts of the machine are illustrated with the smoothing and feeling piston in the completely lowered position in the case that the thickness of the goods to be measured is nought. The band 48 being in the present case also again yieldable passes through a groove provided in the smoothing piston 111 and below the printing piston 135 and passes two guide-rollers 45, 46 mounted in openings 137 of the plate 103 and further passes two other guide-rollers 139 mounted on supports 138 and the disc 47. With the guide-rollers 139 tinging rollers 140 and colour-rollers 141 cooperate, only one element of each group of rollers 140 and 141 being illustrated in Figs. 20 and 21.

The operation is the following:

The drivers 124 of all aggregates are lowered after the feeding-in of the leather or the like, into the slot 107, which feeding-in is preferably accomplished by pairs of rollers arranged in front of the front opening of the slot and driven by a motor. The lowering of the drivers is accomplished by pulling the rods 130 in the direction of the arrow of Fig. 19 through the intermediary of the above mentioned cams or eccentric discs which are not illustrated in the drawings. The disc 124 of each aggregate exerts at its downward motion through the intermediary of the spring 131 a pressure on the piston 111, by which the leather is pressed at the respective point towards the counterplate 102 with a pressure corresponding with the strength of the spring 131. Before the end of its downward motion the disc 124 also exerts through the intermediary of the spring 133 and of the drivers 132 a yielding pressure on the feeling or measuring stamp 121, so that also the said stamp is pressed upon the leather. Shortly before the end of its downward stroke the driver 132 acts upon the rod 134 of the printing piston 135, which presses the type-band 48 towards the leather, so that the imprint of the measure-numeral of the thickness is effected in the manner described above. The return of the parts into their initial position is effected by springs 136, 131 and 114.

In order to avoid on the one hand an excessive stress on the driving mechanism effecting the lowering of the piston 111 and on the other hand also an excessive strain on the plate 103 carrying the aggregates 14 it may be preferable that the pressure actions upon the discs 124 through the intermediary of the levers 126 are not effected all simultaneously but that the one pressure action is effected after the other, which object may be secured by a corresponding displacement of the cams or the like by which the rods 130 are moved. Instead of using the rods 130 and the levers 126 for pressing the discs 124 and with them the smoothing, measuring and marking pistons downwards, such action may also be effected in another way, for instance with the aid of the bolts 142 illustrated in the Figs. 17 and 18, a number of which bolts corresponding with the number of the aggregates project from the lower side of a common plate 104 to come into engagement with the discs 124 at the lowering of the plate. The plate 104 is guided on four posts 105 and is lowered by means of a hydraulic press 106 which may for instance be arranged on the ceiling of the respective room.

The machine described above is of great effect, as by one operation which is the lowering of the plate 104—the same being naturally the case for the aggregates illustrated in Figs. 19-21—all measurements and markings are effected simultaneously all over the leather-surface. Customers who are satisfied with a smaller effect may do away with the plates 103 and 104 and substitute for them transverse members provided with only one row or only a few rows of aggregates 14 and may feed the leather to be treated intermittently into the intervening space 107. The parts are arranged in such a way that at each downward movement of the transverse member a feed-action takes place. In correspondence with the mode of treating mentioned above at the end of the explanation referring to the embodiment according to Figs. 1-12 also only a single or a few rows of aggregates 14 extending in the transverse direction of the table (Figs. 17, 18) may be provided, and the leather be laterally displaced after each printing operation for a distance corresponding with the desired distance of the rows a of printing (Fig. 1).

The general construction of the machine as illustrated in Figs. 23 to 29 is substantially the same as in the earlier cases. In the present embodiment only six measuring and marking aggregates are provided of which only a single aggregate on the left end of the machine is shown in the drawings, whereas the other aggregates are indicated by dotted lines. The aggregates are again fixedly on a cross-girder or traverse comprising two U-irons 204, 205. The carriers 1, 2 of the measuring and smoothing rollers are not arranged to oscillate but to move rectilinearly upwards and downwards. The carriers consist of four-edged rods of steel the lower ends of which are forked for the reception of rollers of which in Fig. 25 only the left-sided rollers 203 are represented. For each measuring and marking aggregate only two carriers for the rollers and correspondingly also only two rollers are provided.

The carriers 201, 202 for the rollers are guided between the two U-irons 204, 205 extending over the whole length of the machine, said guiding being effected with the aid of rollers 206, 207, 208, 209, 210, 211 and of two loose rollers 212, 213. The rollers 208 to 211 are mounted in the webs of the U-irons, and the rollers 206, 207 are mounted in special supports screwed to the lower surfaces of the flanges of the U-irons. The carriers of the rollers are provided on top with inwardly directed projections 201a, 202a of which the first rests upon the latter through the intermediary of an adjusting screw 201b on such a level that the lowest part of the roller 203 is positioned about 1 millimetre below the vertex of the roller of the carrier 202, which roller is not illustrated, the said roller 203 serving simultaneously for the smoothing or levelling of the leather at the point of measurement and also for the measuring proper. The purpose of this arrangement will be explained farther below. The pressing of the rollers towards the leather to be treated is effected by two strong spiral springs 217 acting on the carriers 201, 202 at their upper ends which are provided with centre-pivots 218, such springs abutting against a plate 219 screwed to the upper flanges of the U-irons 204, 205, the leather to be treated passing also a counter-roller as set forth above.

The guide of the carriers 201, 202 at the lower ends is effected on the inside not by rollers corresponding with the rollers 208, 211 for the upper ends, but the guide is effected by means of two loose rollers 212, 213 for the purpose of making as much room as possible for the strong construction of the forked parts of the carriers 201, 202 which parts are during the operation under circumstances very highly strained. In this arrangement pressures exerted in the axial direction on one of the rollers, for instance on the roller 203 are taken up through the intermediary of the respective carrier 201 and the rollers 212, 213 by the other carrier 202 and are transmitted by this carrier through the intermediary of the rollers 207 to the frame of the machine. In this arrangement the rollers 212, 213 occupy in the axial direction a much smaller room than the rollers 208, 211, so that the forked parts of the carrier 201, 202 may correspondingly be of a strong construction without the necessity of an enlargement of the distance between the point of measurement and the point of marking. The rollers 212, 213 roll loosely between the adjacent sides of the carriers 201, 202. For the purpose of avoiding jamming in this arrangement every roller is provided on top and bottom with two pairs of abutting springs 212a and 212b. The upper ends of the springs lean against the horizontal web 220a of a little frame 220 (Fig. 28a) which is mounted at 220b on the support 201, whereas the lower ends rest upon two angular pieces 221 positioned on the carrier 202. The rollers 212, 213 are guided with their inner front-faces by two vertical webs 220c; with their outer front-faces the rollers are guided loosely on the inner surfaces of the webs of the U-irons 204, 205.

As mentioned only two rollers 203 are provided for each aggregate, of which the left-sided roller (Fig. 26) serves for the smoothing and simultaneously for the measuring, whereas the right-sided roller only serves for the smoothing. In the case that the aggregates are not arranged in larger distances as shown in Fig. 24 but are arranged closely side by side, also the right-sided roller may simultaneously serve as measuring roller for the marking device adjacent on the right side.

The embodiment illustrated in Figs. 25 and 26 involves a further simplification of the construction so far as the marking device including the guide for the marking band is not mounted on a special frame as in the case of the main patent but is mounted directly on the carrier 201 of the measuring roller, so that the said marking device forthwith takes part in the upwardly and downwardly directed movements of the said carrier. In this way it is possible to bring the point of marking closer to the point of measurement. The marking is in the present case effected in an electromagnetic way. The solenoid 222 comprises a spool carrying a winding, the said spool having flanges 222a, which are connected with each other by a central small tube 222b. All these parts are screwed to the carrier 201 by means of a plate 222c. At top and bottom iron plates 222d are fastened to the flanges 222a which plates in co-operation with the adjacent iron material of the webs of the U-irons close the path of the lines of force. The plates 222d are provided with central openings for the passage of the marking bolts or stems 223. The upper opening 222e is considerably larger than the lower opening; the upper opening is in the lower position of the stem 223 traversed by the armature 223a positioned on the said stem, by which traversing a strong magnetic attraction is attained. The upper part of the marking stem consists as far as to the separation-line 224 (Fig. 25) of soft iron, and the lower part consists of brass or of another material which is feebly magnetic. The stem 223 is suspended on a spring 225 fastened at 224 on the projection 202a of the carrier 202 and is moreover guided through openings provided in the flanges 222a of the coil of the solenoid and also in the webs 220a of the small frame 220; the lower end of the stem forms a head-piece 223b the lower main face of which acts during the marking operation upon the marking band to press the same together with a colour-band upon the leather, by which action the marking is effected, the said marking band passing underneath the bolt and the said colour-band passing underneath the marking band, the colour-band being indicated in Fig. 25 in dotted lines 227. The marking band 226 consisting preferably of soft rubber and being provided with the measure-numerals and with a scale-graduation in relief-types is guided over two guide-rollers 228, whereas the colour band 227 is guided over two guide-pins 229 positioned on a shield 230 which is connected with the right side-piece 216b (Fig. 26) of the forked portion of the carrier 201. The rollers 228 rotate on pivots 228a each of which forms an extension of a bolt 232 connecting the shield 230 with a second shield 231 fastened to the other side-piece of the said forked portion. The pin 229 forms the extension of a bolt 233 which also connects the shields 230 and 231. As especially shown in Fig. 26 the shield 230 is along its lower margin bent off towards the measuring roller 203 to provide for space for a projection 223c of the head 223b of the marking stem 223, and also for the colour-band 227 which in the direction of its breadth extends beyond the breadth of the marking band to the left (Fig. 26), so that in the marking operation the said colour band is seized by the projection 223c which imprints beside the marked numeral an arrow-shaped index upon the leather which indicates the exact position of the point of measurement relatively to the marked numeral.

At the upper end of the stem 223 forming the core of the solenoid a lateral projection 234 is provided on which a clamping screw 235 is positioned the threaded bolt 236 of which is directed downwardly through the projection and is provided at its lower end with a contact-point adapted to be brought in touch with a contact-plate 237 positioned in a cavity of the plate 222d. The clamping screw 235 as well as its threaded bolt 236 are electrically insulated relatively to the projection 234 and are guided by a disc 238 of soft rubber inserted from below into a cavity of the projection, against which disc a nut abuts which is screwed upon the lower end of the pin 236. The described contact-device (Fig. 29) is in shunt to the circuit of the solenoid, so that this circuit is short-circuited and consequently the attractive force of the solenoid is interrupted, as soon as the pin 236 touches the contact-plate 237. According to the arrangement this will take place, as soon as the marking head 223b has pressed the marking band 226 together with the colour-band 227 sufficiently upon the leather, the contact device having during the operation a certain play caused on the one hand by the elasticity of the material of the marking band and on the other hand by the elasticity of the rubber disc 238. By the described arrangement the marking stem will be immediately drawn back by its spring 225, as soon as a sufficient marking has been effected, so that the mark may not be blurred in consequence of the continual though slow passage of the leather underneath the stamp. In the circuit of the solenoid lies in addition to a battery 240 a contact device containing for instance a brush 241 co-operating with contacts 241a provided on the counter-roller 216, so that at each touch between the contacts the circuit of the solenoid is closed and the marking stem bolt 223 is attracted. By the selection of one of several circular rows of contacts on the roller 216, which contacts are arranged in different spaced relation in said rows, the distance of the markings on the leather may be changed at will.

The displacement of the marking band 226 in correspondence with the thickness of the leather measured for the time is again effected by means of a disc 242 which is rotated by the carrier 201 of the measuring roller through the intermediary of a gear. For this purpose the carrier forms near its upper end at 243 a rack. The rack gears with a toothed wheel 244 which on the other hand gears with a pinion 245. On the shaft 246 of the pinion a toothed wheel 247 is positioned gearing with a pinion 249 on the shaft 248 of the disc 242. The shafts of the toothed wheels are mounted between two plates 250 which are mutually strengthened by bolts 251 and fastened by means of screws 252 on the web of the U-iron 205.

The marking band 226 is guided through bores 253, 254, 255 of the U-iron and over rollers 256, 257, 258 mounted on this iron. The colour-band 227 passes also over guide-rollers which are not illustrated in the drawing and further passes through bores in the flange-portions of the U-iron to band-rollers which are mounted on the flanges of the U-irons and are intermittently subjected to small partial revolutions for instance by the counter-roller 216 or its drive through the intermediary of a ratchet gear. Preferably the controlling gear is arranged in such a way that after each marking operation a partial revolution takes place.

Halves of hides are preferably treated in such a way that they are fed into the machine with the edge of the back in front, as the said edge is rectilinear in contradistinction with the edge of the belly. But as the edge of the back is very thick and steep it would not forthwith pass underneath the measuring and smoothing rollers, which are pressed towards the leather with a pressure which is the stronger the larger the thickness of the leather is. This difficulty is obviated by an arrangement which renders it possible to clear all rollers at will away from the counter-roller 216 and to hold them fast at a large or small distance from the said counter-roller. For this purpose for each carrier of a roller for the support of the one carrier by the other as shown in Fig. 26 only for the supporting carrier 202—a lifting device is provided which consists of a cam 261 engaging a projection 260 of the carrier from below. The cams are preferably fastened in groups on common shaft-sections or on a shaft 262 common for all aggregates and extending over the whole length of the machine, the said shaft 262 being mounted in supports 263 positioned on the respective web of the U-iron 204 and being adapted to be rotated by a hand-wheel 264 positioned for instance at the right end (Fig. 24) of the machine on the outside of the frame. The cams are preferably spaced apart from each other on the shaft 262 in such a way that the one after the other is brought to operation for the purpose of decreasing the maximum power exerted on the hand-wheel 264.

The reason for supporting the carrier 201 carrying the measuring roller and simultaneously the marking device, which support is effected by the carrier 202 serving in the present case only for the smoothing of the leather is the following: The lateral edges of the hide passed through the machine are generally more or less oblique to the axis of the machine. For this reason it often occurs that one of the several rollers of an aggregate, for instance the measuring roller 203 runs down from the edge of the leather or up to the edge, whereas the other roller runs across the leather proper. In the case that this leather laterally reaches as far as underneath the marking band, the latter may scrape on the leather under pressure and may consequently easily be damaged or displaced, as the level of the said band depends from the level of the measuring roller 203 running beside the leather on the counter-roller 216. By the suspension of the carrier 201 and its projection 201a on the carrier 202 also the measuring roller 203, and with it the marking band and the colour-band is kept on a corresponding level in the case that the smoothing roller runs across the leather. But for avoiding a dependency of the adjustment of the marking band and of the value of the imprint of the thickness-measure from the level of the smoothing roller, in a position of the lowest parts of the two rollers on the same level a certain play of about 1 millimetre is provided between the lower end of the adjusting screw 201b on the upper end of the carrier 201, of the measuring roller and the supporting face of the projection 202a of the other carrier 202. In the ordinary case according to which the difference of the values of the thickness of the leather on the one hand underneath the measuring roller and on the other hand underneath the smoothing roller is less than 1 millimetre a damaging of the measuring by the smoothing roller is avoided by this arrangement, as the carrier of the measuring roller is only lifted relatively to the carrier of the smoothing roller, after the latter has moved upwards in a distance exceeding the mentioned play. But this is only exceptionally the case, as there do not exist so considerable differences of the values of the thickness within such small distances. On the other hand in the case that the normal distance of the colour-band 227 from the surface of leather is more than 1 millimetre and for instance 2½ millimetres, as indicated in Fig. 26a no scraping of the band on the leather will occur also in the case that the carrier of the measuring roller and the band move downwards for a distance corresponding with the play of 1 millimetre between the projections 201a and 202a. But for avoiding in this exceptional case an incorrect marking the latter is automatically interrupted, for instance by short-circuiting a circuit in shunt to the coil 222 similar with the circuit described above containing the contacts 236, 237. The said short-circuiting may take place at the touch between the adjusting screw 201b with the projection 202a. Then no marking operation takes place. This also takes place in the case that the measuring roller passes by the side of the leather and the adjacent smoothing roller across the leather. This is quite in order, as also in this case no marking action is desirable. Instead by short-circuiting a circuit in shunt to the winding of the solenoid, the interruption of the marking operation may naturally be executed in another way, for instance by interrupting the circuit of the solenoid—this being also the case at a sudden interruption of the marking movement at the arrival of the marking bolt 223 at a certain deepseated point. An interruption of the marking operation is also in question in the case that the thickness-measure determined by the position of the measuring band does not correspond with the real thickness of the leather at the measuring point. This may occur in the case that the strength of the springs 217 pressing the carriers of the rollers against the leather is not sufficient to equalize especially stiff humps in the leather or in the case that the leather is double-laid such as at turned-up or overlapping portions of the hide especially near the neck. In order to act according to these circumstances the arrangement is made that the marking action is also interrupted in the case that the distance of a measuring roller from the counter-roller 216 exceeds a certain maximum measure which is for the thickness of a single sheet of leather the extreme limit, for instance 8 millimetres. This may for instance be attained in such a way that in the case of a stroke of more than 8 millimetres the respective carrier of the measuring roller closes a short-circuiting contact lying in shunt to the winding of the solenoid. This contact may for instance be arranged within the reach of the strokes of the carrier of the measuring roller and may be positioned on a U-iron guiding the said carrier. Simultaneously with the interruption of the marking operation also the whole machine may in such cases be stopped by interrupting for instance with the aid of the mentioned contact-device the circuit of the driving motor. Then it is possible to do away with any disturbances and to smooth over for instance turned-up or overlapping leather portions which may have caused the extreme stroke of the measuring roller. It may also be preferable to interrupt the circuit of the motor automatically also in view of other disturbances, for instance in the case that in the passage of the leather an exceptionally high resistance occurs. This may for instance be attained by a rotary arrangement of the counter-roller relatively to its drive in combination with an interposed strong spring. The relative rotation of the roller arising at a high resistance against the feed may then be used for the actuation of an interrupter lying in the circuit of the motor.

It is preferable to provide in all three cases for an adjusting of the length of the path along which the short-circuiting contacts have to be moved to come in touch with each other, so that the short-circuiting may be adapted to different conditions. In the contact device 237, 238 (Fig. 25) the adjustment is for instance effected by screwing down the threaded pin 236.

In order to facilitate the passing of the measuring and smoothing rollers up to the surface of the leather in the case that the edge of the leather is oblique to the direction of the feeding-in, the rollers are provided with edges levelled with an angle of about 45°, such edges being moreover provided with flutes which are preferably diagonal relatively to the respective cone-lines.

In the case that especially thick and refractory hides have to be worked up it is not preferable constantly to maintain the full operating pressure on the smoothing roller and in a certain case also on the measuring roller, as then a very high wear on the counter-roller 216 and also a very high straining of the cross-bar (204, 205) carrying the measuring and marking aggregates would result, so that very strong and heavy constructions would be necessary. For this purpose the adjustable but stationary abutments 272 for the springs 217 according to Fig. 25 may be substituted by periodically revolving abutments forming for instance cams positioned as in the arrangement of the cams 261 on a common shaft which is rotated by the counter-roller 216 or its drive, so that each spring or group of springs 217 will operate with the maximum pressure one after the other. For this purpose the cams are correspondingly in such a way angularly spaced apart to each other on their shaft that the maximum pressure is exerted on the leather always in the moment of the measuring and marking operation.

The plane-table 265 for the feeding-in and in a certain case also the plane-table for the escape of the leather is for the purpose inclined, as shown in Fig. 23, so that the leather forms below the measuring and smoothing roller an obtuse angle the sides of which diverge downwardly. This effects a certain stretching also of a leather full of boils, the said stretching taking place near the line of the vertex also without the application of an especially high pressure, with the aid of the measuring and smoothing rollers. For additionally smoothing and levelling down the leather and after all for a convenient feeding-in of the leather into the machine above the respective table 265 a bent piece 267 carrying glide-rollers 266 is provided close by the front of the counter-roller 216, such bent piece extending substantially over the whole length of the machine and being actuated by a lever 269 mounted at 268 on the frame of the machine, the said bent piece being adapted to be moved downwards by a pedal 270 and against the influence of a spring or of several springs 271 tending to clear the bent piece away from the table 265, the leather being by such means on the one hand levelled down and smoothed, whereas on the other hand a sliding down of the leather from the inclined table 265 is prevented during the feeding-in.

The embodiment illustrated in the Figs. 17 to 21 may be considerably simplified by uniting the feeling and smoothing elements with each other; preferably the printing stem is then arranged concentric with the united feeling and smoothing elements in the interior of the latter. A correspondingly modified measuring and marking mechanism is illustrated in the drawings in Figs. 30 and 31 in two vertical axial sections the one of which is taken at right angles to the other.

The general arrangement of the machine may correspond with the arrangement according to Fig. 17. In the illustrated case it is supposed that the individual measuring and printing aggregates are mounted on two U-irons 304, 305 arranged in pairs as in the embodiment according to Figs. 25 and 26, the counter roller provided in the above described embodiment being here substituted by a stationary table 306. Across this table the leather or the like to be measured is moved in the direction of the arrow in Fig. 30. This movement is an intermittent one in the case that only one or individual groups of measuring and printing mechanisms are provided, the measuring and printing of the measure-numerals of each group of aggregates taking place in the pauses of the said intermittent movement. But in the case that in correspondence with Fig. 18 the breadth of the table corresponds with the total breadth of the piece of leather to be worked up, and that the whole surface of the table is occupied by the measuring and printing aggregates, the leather or the like is in its whole breadth fed into the machine then measured and marked, after which the leather is again discharged from the machine.

The elements for the levelling down or smoothing of the leather or the like and for the feeling of the same are again guided between the U-irons 304, 305, and are also in any number preferably equally distributed over the length of the U-irons in accordance with the distances in which the rows of the measuring points are intended to pass. The lateral guide is effected by means of rails 307. Each of the feeling and smoothing elements consists in the present case of a plunger-like body 308 or piston having a square cross-section and being shaped like a piston, such body having a central bore for the reception of the marking stem 309. The said stem is provided at its lower end with a head-piece 310 of square cross-section. The stem is provided at its upper end with two flanges 311, 312 against which abut two springs, an upper strong spring 313 and a lower spring 314 of smaller strength, the other ends of which springs abut against the upper side of the piston 308, and against the lower side of a second piston 315 having also a square cross-section. The upper end of the stem 309 of the stamp extends into a bore of the piston 315. The latter is provided with an opening 316 passing through in the direction of the feed of the material to be measured, as especially shown in Fig. 31.

The lower end of the feeling and smoothing piston 308 is also provided with an opening 317 which is open at its lower end, and which passes through in the direction of the feed. Between the two pistons 308 and 315 a strong spiral spring 318 is arranged.

The printing mechanism is arranged substantially as in the case of Fig. 13. It comprises a rubber-band 319 which is provided on its outer side with relief types representing the measure-numerals and further with a scale-graduation. The band is displaced through the intermediary of a disc or roller 320 in accordance with the level of the piston 308, and therefore also in accordance with the thickness of the leather, the said displacement being effected in such a way that the point of the graduation corresponding with the measured thickness-value will be positioned above the respective measuring point, after which the imprint of the measure-numeral takes place in a way which will be described below. The band 319 passes over the disc 320 and another disc 321 of equal size positioned symmetrically to the first one, and further passes over two lower rollers 322 also mounted on the fixed frame formed by the U-irons, and also over two rollers 323 mounted in the opening 317 of the piston 308. The movement of the piston 308 is transmitted to the disc 320 through the intermediary of a toothed gear consisting of two toothed wheels 324, 325. The wheel 324 gears on the one hand with a rack 326 provided on the piston 308, and gears on the other hand with a pinion 327 being keyed to the shaft of the wheel 325. The wheel 325 gears with a pinion 328 positioned on the shaft of the disc 320. In the disc 320 a watch-spring 329 is arranged which is on the one hand through a pin 330 in connection with the disc, and on the other hand with one of the plates 331 forming the frame for the transmission-gear. The spring 329 is previously tensioned and then inserted into the disc 320. By this arrangement the piston 308 is forced upwards with the tension of the spring multiplied with the ratio of transmission of the gears 324, 325, 327, 328. Moreover the spring does away in the gear with any dead motion which might decrease the exactness of the measuring.

On the upper side of the U-irons 304, 305 bearings are fastened in pairs for the reception of a shaft 332 extending all over the breadth of the machine, which shaft carries between two bearings a cam 333 against which the upper piston 315 is pressed through the intermediary of the spring 329, the lower piston 308 and the gear, so that at the rotation of the shaft 332 the two pistons 315 and 308 periodically move upwards and downwards within the limits defined by the stroke of the cam 333. The limits are adjusted in such a way that the lower side of the piston 308 is in its highest position on a level with the lower side of the U-irons 304, 305, so that a free passage is left for the leather to be measured, whereas the distance of the lower side of the piston from the abutment-table 306 corresponds in the lower end-position of the path with the smallest thickness-measure which has to be considered. The piston may in its lower position also directly take its seat upon the table 306.

The operation is the following: After the feeding-in of the leather or other goods to be measured between the lower side of the U-irons 304, 305 and the top 306 of the table, while the piston 308 is lifted, and after the goods have come to a standstill, the cam shaft 332 is rotated. This may be effected for instance by means of a chain transmission from the shaft of the roller 363 (Fig. 35) or from the main drive shaft of the machine, which main shaft in turn may be driven as in the case of Figs. 3 and 4 by an electro-motor. The cams 333 then press the pistons 315 and together with the latter the pistons 308 through the intermediary of the strong springs 318 downwards, until the pistons 308 take their seat on the surface of the leather. In the case of hollows below the leather at the respective point the downward movement of the piston 308 is continued, until the respective hump in the leather is completely levelled down, so that it is evident that the distance of the lower side of the piston 308 from the surface of the table 306 will correspond with the real thickness of the leather at the respective point. After the piston 308 has in this way reached its deepest position the downward motion of the piston 315, and the corresponding compression of the spring 318 is continued. The printing stem 309 having up to this moment by means of the spring 313 been kept in its upper end-position shown in Fig. 30 is now through the intermediary of the spring 314 moved downwards relatively to the piston 308. The printing stem thereby engages the lower horizontal section of the measuring band 319 and presses the band upon the leather lying below it, so that the imprint of the numeral of the thickness-measure is effected at the respective point. In the meanwhile the cam 333 has passed in its highest portion by the upper side of the piston 315, so that the whole system of pistons is now returned again into its upper end-position under the action of the spring 329.

The measuring band 319 may be tinged with the aid of colour-rollers as in the embodiment according to Fig. 20 or may be used in combination with a special colour-band as in the embodiment according to Fig. 5. For securing an exactly symmetrical displacement of the elastic measuring band relatively to the fixed point determined by the support on the disc 320 at the lowering of the piston 308 the disc 321 as indicated on the left side of Fig. 30 may also be driven by the piston 308 through the intermediary of a gear which must, however, be provided additionally with an intervening wheel 334 to attain correspondence of the direction of rotation of the disc 321 with the direction of rotation of the disc 320. Into the disc 321 a spiral spring 335 is then also inserted which acts in the same direction as the spring 329. Instead of providing an additional gear on the left side, the symmetrical displacement of the measuring band 319 might be obtained by positively coupling the discs 320, 321 with each other, for instance by means of a chain passing over chain-wheels positioned on the two shafts of the discs. The cams 333 are in such a way spaced apart relatively to each other on their shaft that the feeling and smoothing elements of a group are pressed downwards in sequence for the purpose of decreasing the maximum strain on the cross-bar formed by the U-irons 304, 305 and of decreasing correspondingly the deformations of the cross-bar in order to avoid the exactness of the measurements to be reduced and to render possible the construction of the cross-bar of relatively small weight.

The exactness of the measurement may also be rendered independent from deformations of the cross-bar in such a way that as in the embodiment according to Fig. 17 the lowering of the feeling and smoothing elements is effected by a pressing device preferably common to all aggregates, which device is independent from the parts of the machine carrying the measuring elements—this being also the case for equally acting parts of the machine forming abutments against the pressure acting on the feeling and smoothing elements.

In view of the entire construction of the machine the following has to be mentioned in referring to Fig. 35: The leather or the like 361 is preferably passed underneath the cross-bar 364 carrying the measuring and marking aggregates by means of a feeding roller 363 mounted below the table 362 on the discharge-side of the machine. The roller 363 is continually driven and co-operates with a pressure roller 366 being preferably smaller and mounted above the said feeding roller 363 on two double-armed levers 365. The pressure roller 366 is pressed against the main roller 363 or cleared away from it by rocking the lever 365 in order to provide for a feed or for a standstill of the leather or the like to be worked. On the ends of the levers 365 at the inlet-side of the machine a third roller 367 is mounted which at its downward movement presses the leather passing below it against the table to hold the leather fast. The periodical rocking of the lever-system is preferably executed automatically with the aid of a cam 368 positioned on the shaft of the main roller 363 and of a link or rod 369 co-operating with the said cam, which link or rod lifts the left end of the lever-system against the influence of a spring 370 tending to hold the leather in touch with the feeding roller by means of the roller 366 mentioned before.

By the rod 369 also a coupling may be controlled connecting the cam-shaft 332 with its drive, this control being executed in such a way that the cam shaft 332 makes at each stroke of the rod 369 a revolution, and thereby effects the imprint of the adjusted measured thickness-values after which the cam-shaft is again automatically stopped, and the feed of the leather or the like begins anew, each stroke of the rod causing a pause in the feed of the leather.

Further improvements relate to arrangements through which the printing mechanism is made inoperative at the occurrence of points in the leather which are not of a normal thickness. Such arrangements are especially of importance for machines of the construction shown in the Figs. 5, 6, 13, 14, 25 and 26. In the foregoing description an arrangement has already been described which prevents an imprint in the case that the leather to be measured shows within small distances great differences of thickness, for instance differenes of 1 millimetre, as it may be in the case of depressions in the leather which are the consequences of scars or the like, also in the case of humps such as warts and in the case of turned-up or over-lapping portions. In all these cases an imprint of the respective thickness would give a wrong idea of the distribution of thicknesses of the respective piece of leather. For this reason the imprint is automatically prevented by the described arrangement.

In machines of the construction according to Figs. 5, 6, 13, 14, 25 and 26 this is also necessary in the case that the feelers come in a short succession in touch with points of relatively considerable differences of the thickness during the passing of the leather underneath the feeler. In these cases the interruption of the marking operation in correspondence with the present invention is rendered dependent upon the sudden acceleration of the upward or downward motion of the feeler, which dependency may for instance be obtained by means of the device shown in the Figs. 32 and 33 in a vertical section, respectively in a side view turned about a right angle. This device is for instance positioned upon the upper flanges of the U-irons 204 and 205 of the machine illustrated in Fig. 25. The device consists substantially of a cylinder 341 in which a piston 342 is movably arranged, the cylinder being closed by a cover 340. The piston rod 343 extends through an upper stuffing box 344 and a lower stuffing box 345 from the inside to the outside of the cylinder. The lower end of the piston-rod is directly connected with the carrier 201 for the feeler-element 203 (Fig. 26). The spaces above and below the piston 342 are in communication with each other by means of a channel 345. They are filled with a liquid such as oil or glycerine, so that a displacement of the piston relatively to the cylinder results in a flow of the liquid through the channel 345. The throttling resistance caused thereby may be regulated by a screw 346 operating like a valve.

As shown in Fig. 33 the cylinder 341 is guided by two rods 347, 348 which pass through bores of ears 349 positioned on the cylinder. The guide rods 347, 348 are fastened on the plate 19 relatively to which the rods are electrically insulated. Around the rods draw-springs 350 are coiled which act on the ears 349 and press the cylinder 341 with its lower stuffing box against a projection 351 of the plate 19. On the cover 340 of the cylinder a small frame 352 is fastened and electrically insulated relatively to the said cover, which frame serves for the guide of a contact-pin 353 forced by a spring 354 downwards and having its lower end ordinarily in contact with the guide-rod 347. The contact-pin 353 and the guide-rod 347 are in such a connection with the circuit for the actuation of the electric printing mechanism (Fig. 29) that the circuit is interrupted and simultaneously the printing mechanism made inoperative, as soon as the contact-pin 353 is cleared away from the rod 347.

The operative cross-section of the throttling channel 345 is so dimensioned that only by an unusually rapid upward motion of the feeler arising for instance at the ascending a hump in the leather an interruption of the circuit is effected by the transmission of the motion to the cylinder 341 and the contact-pin 353 through the intermediary of the piston-rod 343. During the normal slow upward and downward motions of the feeler the period is sufficient to allow a low of the liquid in the cylinder 341 from the one side of the piston through the throttling channels to the other side of the piston, so that the cylinder maintains its normal position and the operating circuit for the printing mechanism remains closed.

The interruption of the marking operation in dependency on a sudden movement of the feeler-element may naturally be attained also in another way, for instance with the aid of a governor which may possibly be arranged on the shaft 248 of the disc 242 for the measuring band 226 according to Fig. 25 and which may at a certain stroke of its governing balls interrupt the circuit of the solenoid of the printing mechanism or make the latter in another way inoperative.

The contact interrupting the circuit of the marking mechanism in the case that the feeler or the carrier 201 of the measuring roller (Fig. 26) is taken along by the carrier 202 of the smoothing device or of the printing roller at the upward motion of the last-mentioned carrier, and the said interrupting contact is preferably provided between the projection 201a and 229 (Fig. 34) by inserting a contact-pin 355 into the projection 201a which is electrically insulated relatively to the contact pin. This pin co-operates with a small contact-plate provided on the projection 229. As soon as this contact is arranged within a circuit parallel to the coil of the solenoid (Fig. 29), and the said contact is closed relatively to the feeler 201 by lifting the smoothing element 202, the coil is short-circuited, so that the printing stamp cannot come into operation.

On the projections 201a and 229 instead of the described contact also another contact may be provided which normally closes the circuit and therefore interrupts the marking operation only in the case that the difference of levels between the feeler and the smoothing element is more than a certain value, for instance 2 millimetres. In the case as for instance at the occurrence of turned U portions of the leather, in which case the smoothing roller lies already on the part of the leather resting in a flat condition on the abutments whereas the measuring roller still lies on the part of the leather covering a hollow such last-mentioned part forming the transition from a normal portion to the turned-up portion, the arrangement as described before effecting the omission of the marking operation which would give a false idea of the thickness of the leather of the portion above the hollow. In order that the portion of the measuring band 226 (Fig. 25) or 319 (Fig. 30) corresponding with the thickness-value in question is exactly opposite to the measuring point, provision must be made that the expansion of the band due to its elasticity is exactly a symmetrical one relatively to the disc 320, the said expansion taking place at the lowering of the lower horizontal section of the band. In leaving out the arrangement of a second toothed wheel as already proposed, this may be attained in the way that parts of the band 319 and in the illustrated case for instance the upper horizontal band-section between the discs 242, 256 (Fig. 25) respectively the discs 320, 321 (Fig. 30) is not made elastic but rigid against expansion. The rotation of the cam-shaft 262 (Fig. 25) must not be executed manually but may be effected automatically by the drive of the machine preferably in the way that in the pauses always between two marking operations the shaft is subjected to a short rotation to and fro by which the printing and measuring rollers are always cleared away from the leather for a short time. In this way an oblique passage and a jamming of the leather during the passage is avoided.

In the case that measuring lines lying close together are desired (Fig. 1) especially in the embodiment according to Figs. 25 and 26 also the smoothing rollers may be constructed to form in combination measuring or feeling rollers by combining each roller-system with a printing mechanism, so that for the whole machine only systems of measuring rollers joined with printing stamp-mechanisms are provided without the intercalation of smoothing rollers.

So far as in the foregoing paragraphs and in the claims is said that the goods to be worked up are of leather no limiting of the application of the invention to the working up of leather should be assumed. Under the term "leather" not only leather but also other sheet-material has to be understood for which the task according to the present invention is of importance.

I claim:

1. Machine for measuring the thickness of leather or other sheet material at a plurality of points distributed over its surface and for printing the values of thickness ascertained upon the material near the points of measurement, comprising in combination: a support for the material to be measured, a fixed framework, a feeler movable towards said support, a type carrier, printing means adapted to move said type carrier towards said support, and a gearing permanently in positive engagement both with said feeler and said type-carrier, the members of said gearing being immovable relatively to each other during the printing operation.

2. Machine as claimed in claim 1, comprising a driver for the type-carrier, said driver being rotatably mounted on a fixed part of the framework of the machine, that part of the type-carrier adjacent the measuring point being displaceable relatively to the bearing of said driver in the direction towards the material to be measured.

3. Machine of the class described, comprising in combination: a support for the material to be measured, a fixed framework, a feeler movable towards said support, a type-carrier, printing means adapted to move said type-carrier towards said support and a gearing permanently in positive engagement both with said feeler and said type-carrier, said type-carrier enclosing said feeler and said printing means and being arranged substantially in a common plane with said printing means.

4. Machine of the class described, comprising in combination: a support for the material to be measured, a fixed framework, a feeler member movable towards said support, a type-carrier, printing means adapted to move said type-carrier towards said support and a gearing permanently in positive engagement both with said feeler and said type-carrier, said type-carrier comprising a flexible member guided on a fixed part of the framework to pass near the measuring point in close proximity of the support of the machine.

5. Machine as claimed in claim 4, the type-carrier of which comprises an endless tape guided by rollers mounted in proximity of the support on a part of the machine-frame which is stationary relatively to said support.

6. Machine as claimed in claim 4, the type-carrier of which comprises an endless tape guided by rollers mounted in proximity of the support on a part of the machine-frame which is stationary relatively to said support, and having two auxiliary guiding rollers for the type-carrier, said rollers being arranged in front and in rear of the measuring point and having bearings which are guided for upward and downward movement relatively to a stationary part of the framework, said stationary part carrying also the bearings of the guiding rollers for the type-carrier.

7. Machine as claimed in claim 4, the type-carrier of which comprises an endless tape guided by rollers mounted in proximity of the support on a part of the machine-frame which is stationary relatively to said support, in which the endless tape is guided by two rollers symmetrically to the vertical plane passing the point of measurement and extending rectangularly to the direction of the feed of the material to be measured, the two guiding rollers being under spring influence tending to move them in opposite directions.

8. Machine as claimed in claim 4, having guiding rollers for the type carrier, said guiding rollers being mounted resiliently and symmetrically to the marking point so as to be displaceable transversely to the direction of the movement of the feeler.

9. Machine of the class described, comprising in combination: a support for the material to be measured, a fixed framework, a feeler movable towards said support, a type-carrier, printing means adapted to move said type-carrier towards said support and a gearing permanently in positive engagement both with said feeler and said type-carrier, said printing means comprising a printing member movable upwards and downwards independently upon the type-carrier and being normally out of contact with the latter.

10. Machine as claimed in claim 9, the printing member having a head with a projection carrying an index stamp the said projection extending laterally beyond the type-carrier and downwards beyond the lower side of the said head.

11. Machine as claimed in claim 9, characterized by the feature that the printing member is carried by and guided on the feeler.

12. Machine of the class described, comprising in combination: a support for the material to be measured, a fixed framework, a feeler movable towards said support, a type-carrier, printing means adapted to move said type-carrier towards said support, a gearing permanently in positive engagement both with said feeler and said type-carrier, and means to actuate said printing means in dependency on the movement of the feeler.

13. Machine of the class described, comprising in combination: a support for the material to be measured, a fixed framework, a feeler movable towards said support, a type-carrier, printing means adapted to move said type-carrier towards said support, a gearing permanently in positive engagement both with said feeler and said type-carrier, and means to actuate said printing means in dependency on the movement of the type-carrier.

14. Machine of the class described, comprising in combination: a support for the material to be measured, a fixed framework, a feeler movable towards said support, a type-carrier, feeding means adapted to continuously feed the material to be measured over said support, printing means adapted to rapidly move said type carrier towards said support and to return it instantaneously, and a gearing operatively connecting said feeler and said type-carrier.

15. Machine of the class described, comprising in combination: a support for the material to be measured, a fixed framework, a feeler movable towards said support, a type-carrier, printing means adapted to move said type-carrier towards said support and a gearing permanently in positive engagement both with said feeler and said type-carrier, said feeler, type-carrier and printing means being mounted on a common structure adapted to be adjusted transversely to the feeding direction of the material to be measured and to be fixed in the adjusted position.

16. Machine as claimed in claim 12, the feeler of which having the form of a wheel, the shaft of said wheel being provided with cams adapted to actuate the printing means.

17. Machine as claimed in claim 13, characterized by the feature that on the type-carrier or its driving member contacts are provided in distances corresponding with those between the types, said contacts co-operating with a stationary adjustable contact of a circuit containing a source of current and an electromagnet for actuating the printing means, so that an imprint will take place, as soon as the type corresponding with the movable contact passes the measuring point.

18. Machine of the class described, comprising in combination: a support for the material to be measured, a fixed framework, a feeler member, a feeler movable towards said support, a type-carrier, printing means adapted to move said type-carrier towards said support, a gearing permanently in positive engagement both with said feeler and said type-carrier, and means adapted to cause said printing means to become inactive at an abnormally rapid stroke of said feeling member.

19. Machine of the class described, comprising in combination: a support for the material to be measured, a fixed framework, a feeler, feeler actuating means adapted to periodically move said feeler up and down, a type-carrier, a printing member adapted to move said type-carrier towards said support and a gearing operatively connecting said feeler to said type-carrier, said printing member being guided within the feeler.

20. Machine of the class described, comprising in combination: a support for the material to be measured, a fixed framework, a vertically extending feeler, feeler actuating means adapted to periodically move said feeler up and down, a tape-like type-carrier, a printing member adapted to move said type-carrier towards said support, a gearing operatively connecting said feeler to said type-carrier, a groove in the bottom part of said feeler, extending in the feeding direction of the material to be measured, said printing member being guided within said feeler and projecting into said groove, and auxiliary guiding rollers for said type-carrier within said groove.

21. In a machine of the class described, comprising in combination: a support, a frame work, a traverse supported by said framework a small distance above said support, a feeler member guided on said traverse to be movable up and down in straight lines, a driver guided on said traverse above said feeler member and in alignment therewith, spring means inserted between said driver and said feeler member and tending to urge them away from each other, a printing member guided within said feeler member and adapted to be moved by said driver towards said support, a printing spring between said driver and said printing member, a spring between said feeler member and said printing member, a type-band guided both on said traverse and on said feeler member and adapted to be stretched towards said support, a gearing mounted on said traverse and operatively connecting said feeler to said type-band, said type-band enclosing said feeling and said printing member, a return spring acting upon the uppermost elements of said gearing and tending to urge said feeling member upwards, and a rotating member adapted to periodically move said driver downwards.

22. In a machine of the class described in combination: a fixed framework carrying a support for the material to be measured, a feeler, a printing device comprising a type-carrier, motor driven means adapted to periodically actuate both said feeler and said printing device and a gearing operatively connecting said feeler to said type-carrier.

23. In a machine of the class described in combination: a fixed framework carrying a support for the material to be measured, a feeler, a printing device comprising a type-band, motor driven means adapted to periodically actuate both said feeler and said printing device and a gearing operatively connecting said feeler to said type-band, said band being guided partially on a fixed part of said framework and partially on said feeler.

24. Machine of the class described, comprising in combination: a fixed framework carrying a support for the material to be measured, a feeler movable towards said support, a flexible type-carrier, electromagnetically operated printing means adapted to move said type-carrier towards said support, and a gearing permanently in positive engagement both with said feeler and said type-carrier.

25. Machine of the class described, comprising in combination: a support for the material to be measured, a fixed framework, a feeler, feeler actuating means adapted to periodically move said feeler up and down, a type-carrier, printing means adapted to move said type-carrier towards said support, and a gearing in positive engagement both with said feeler and said type-carrier the members of said gearing being immovable relatively to each other during the printing operation.

26. Machine of the class described, comprising in combination: a support for the material to be measured, a fixed framework, a plurality of feeler members, a plurality of feelers movable towards said support, a plurality of type-carriers, printing means adapted to move said type-carriers towards said support, and a plurality of gearings each of which comprises a rack immediately connected to any one of said feeler members, the members of each of said gearings being immovable relatively to each other during the printing operation.

27. Machine of the class described, comprising in combination: a support for the material to be measured, a fixed framework, a feeler, motor driven feeler actuating means adapted to reciprocate said feeler, and comprising a periodically actuating driving member, a type-carrier, printing means adapted to move said type-carrier towards said support, a gearing operatively connecting said feeler to said type-carrier, means for feeding the material to be measured intermittently by sections, and spring means operatively interposed between said feeler and said drive member.

28. Machine of the class described comprising in combination: a support for the material to be measured, a fixed framework, a feeler, motor driven feeler actuating means adapted to reciprocate said feeler and comprising a periodically actuating driving member, a driver in operative connection with said driving member, a type-carrier, printing means adapted to move said type-carrier towards said support, a gearing operatively connecting said feeler to said type-carrier, means for feeding the material to be measured intermittently by sections, and a spring between said feeler and said driver.

29. In a machine as claimed in claim 28, means adapted to guide said feeler and driver in a straight line and in alignment with each other.

30. Machine as claimed in claim 27, the printing means of which being operated by said driving member.

31. Machine as claimed in claim 28, the printing means of which being operated from said driving member through the intermediary of said driver.

32. Machine of the class described, comprising in combination: a support for the material to be measured, a fixed framework, a plurality of aggregates each comprising a feeler, a type-carrier, a gearing operatively connecting said feeler to said type-carrier and a printing member adapted to move the respective type-carrier towards said support, motor driven feeler actuating means adapted to periodically move said feelers towards said support, and means for intermittently feeding the material to be measured, said aggregates being mounted on a common traverse extending above said support in a direction at right angle with the feeding direction of the material to be measured, the type-carriers having the form of an endless tape, each of said tapes surrounding one of said aggregates and extending through openings provided in said traverse.

33. Machine as claimed in claim 28, the printing means of which being operated from said driving member through the intermediary of said driver, and a spring inserted between said printing means and said driver.

34. Machine of the class described, comprising in combination: a support for the material to be measured, a fixed framework, a feeler, motor driven feeler actuating means adapted to reciprocate said feeler, and comprising a driver, a periodically operating driving member engaging said driver and adapted to move it towards said support, a type-carrier, printing means adapted to move said type-carrier towards said support, a gearing operatively connecting said feeler to said type-carrier, means for feeding the material to be measured intermittently by sections, spring means between said driver and said feeler, and spring means tending to move said feeler away from said support.

35. Machine of the class described, comprising in combination: a support for the material to be measured, a fixed framework, a feeler, motor driven feeler actuating means adapted to reciprocate said feeler, and comprising a driver, a periodically operating driving member engaging said driver and adapted to move it towards said support, a type-carrier, printing means adapted to move said type-carrier towards said support, a gearing operatively connecting said feeler to said type-carrier, means for feeding the material to be measured intermittently by sections, spring means between said driver and said feeler, and a return spring tending to move said feeler upwards through the intermediary of said gearing.

36. Machine of the class described, comprising in combination: a support for the material to be measured, a fixed framework, a feeler, motor driven feeler actuating means adapted to reciprocate said feeler, a type-carrier, printing means adapted to move said type-carrier positively towards said support, a gearing operatively connecting said feeler to said type-carrier, and means for feeding the material to be measured intermittently by sections.

37. Machine of the class described, comprising in combination: a support for the material to be measured, a fixed framework, a feeler member, a feeler movable towards said support, a type-carrier comprising an endless tape, printing means adapted to move said type-carrier towards said support, a gearing permanently in positive engagement both with said feeler and said type-carrier, guide rollers mounted in proximity of said support on a part of said framework which is stationary relatively to said support, two auxiliary guiding rollers for the type-carrier, said auxiliary guiding rollers being arranged in front and in rear of the measuring point and having bearings which are guided for upward and downward movement relatively to a stationary part of the framework, said stationary part carrying also the bearings of the guiding rollers for the type-carrier, the bearings for said auxiliary guiding rollers being connected to said feeler member in such a way as to partake of its upward and downward movement.

38. Machine of the class described, comprising in combination: a support for the material to be measured, a fixed framework, a feeler, motor driven feeler actuating means adapted to periodically reciprocate said feeler, a type-carrier, type-carrier actuating means adapted to reciprocate said type-carrier in accordance with said feeler actuating means, a gearing operatively connecting said feeler to said type-carrier, and means for feeding the material to be measured.

39. In a machine of the class described, comprising in combination: a support for the material to be measured, means for feeding said material over said support in a predetermined direction, a plurality of measuring and printing devices arranged in a row rectangular to said feeding direction, each of said measuring and printing devices comprising a feeler and a type-carrier, a gearing operatively connecting each of said feelers to its pertaining type-carrier, and motor driven means adapted to periodically move said feelers and said type-carriers towards and away from said support.

HANS ERICH KLEINSCHMIDT.